(12) United States Patent
Wang

(10) Patent No.: US 11,706,398 B2
(45) Date of Patent: Jul. 18, 2023

(54) SIGNALING A CANCEL FLAG IN A VIDEO BITSTREAM

(71) Applicant: Huawei Techologies Co., Ltd., Shenzhen (CN)

(72) Inventor: Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/886,946

(22) Filed: May 29, 2020

(65) Prior Publication Data

US 2020/0296351 A1    Sep. 17, 2020

Related U.S. Application Data

(63) Continuation of application No. PCT/US2019/018573, filed on Feb. 19, 2019.

(60) Provisional application No. 62/645,922, filed on Mar. 21, 2018.

(51) Int. Cl.
| | |
|---|---|
| *H04N 13/194* | (2018.01) |
| *H04N 13/161* | (2018.01) |
| *H04N 19/176* | (2014.01) |
| *H04N 19/184* | (2014.01) |
| *H04N 19/597* | (2014.01) |
| *H04N 19/70* | (2014.01) |
| *H04N 19/463* | (2014.01) |

(52) U.S. Cl.
CPC ......... *H04N 13/194* (2018.05); *H04N 13/161* (2018.05); *H04N 19/176* (2014.11); *H04N 19/184* (2014.11); *H04N 19/597* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 2015/0222928 A1* | 8/2015 | Tian | H04N 19/513 375/240.16 |
| 2017/0332085 A1* | 11/2017 | Ramasubramanian | H04N 19/167 |
| 2018/0199071 A1 | 7/2018 | Wang et al. | |
| 2019/0356899 A1* | 11/2019 | Oh | H04N 21/2343 |
| 2020/0068269 A1 | 2/2020 | Deshpande | |

FOREIGN PATENT DOCUMENTS

CN    101878649 A    11/2010

OTHER PUBLICATIONS

Oh, H., et al., "Supplemental enhancement information set SEI message," Joint Collaborative Team on Video Coding (JCT-VC) of ITU-T SG 16 WP 3 and ISO/IEC JTC 1/SC 29/WG 11, JCTVC-AB0036, Jul. 15-21, 2017, 6 pages.

(Continued)

*Primary Examiner* — Christopher Braniff

(74) *Attorney, Agent, or Firm* — Conley Rose, P.C.

(57) ABSTRACT

A method of coding implemented by a video encoder. The method includes encoding a representation of video data into a bitstream, the bitstream being prohibited from including a fisheye supplemental enhancement information (SEI) message and one of a projection indication SEI message and a frame packing indication SEI message that both apply to any particular coded picture in the bitstream; and transmitting the bitstream to the video decoder.

20 Claims, 12 Drawing Sheets

(56) References Cited

OTHER PUBLICATIONS

Oh, H., et al., "Omnidirectional fisheye video SEI message," Joint Collaborative Team on Video Coding (JCT-VC) of ITU-T SG 16 WP 3 and ISO/IEC JTC 1/SC 29/WG 11, JCTVC-AC0034, Oct. 19-25, 2017, 6 pages.

Sullivan, G., et al., "Meeting report of the 29th Meeting of the Joint Collaborative Team on Video Coding (JCT-VC), Macao, CN, Oct. 19-24, 2017," Joint Collaborative Team on Video Coding (JCT-VC) of ITU-T SG 16 WP 3 and ISO/IEC JTC 1/SC 29/WG 11, JCTVC-AC1000-V1, Oct. 19-24, 2017, 66 pages.

Boyce, J., "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11, JCTVC-AC1005-v2, Oct. 19-25, 2017, 44 pages.

Oh, H., et al., "Omnidirectional fisheye video SEI message," Joint Collaborative Team on Video Coding (JCT-VC) of ITU-T SG 16 WP 3 and ISO/IEC JTC 1/SC 29/WG 11, JCTVC-AD0023r2, Jan. 20-26, 2018, 6 pages.

Wang, Y., et al., "On fisheye video information SEI message," Joint Collaborative Team on Video Coding (JCT-VC) of ITU-T SG 16 WP 3 and ISO/IEC JTC 1/SC 29/WG 11, JCTVC-AE0023-v1, Apr. 13-20, 2018, 4 pages.

Boyce, J., et al., "Additional Supplemental Enhancement Information for HEVC (Draft 3)," Joint Collaborative Team on Video Coding (JCT-VC) of ITU-T SG 16 WP 3 and ISO/IEC JTC 1/SC 29/WG 11, JCTVC-AG1005-v1, Oct. 6-12, 2017, 36 pages.

Wang, Y., et al., "Comments on and proposed changes to the draft text for additional SEI messages," Joint Collaborative Team on Video Coding (JCT-VC) of ITU-T SG 16 WP 3 and ISO/IEC JTC 1/SC 29/WG 11, JCTVC-AA0022, Mar. 31-Apr. 7, 2017, 6 pages.

Champel, M., et al., "[OMAF] Dynamic RWP based HEVC media profile," ISO/IEC JTC1/SC29/WG11 MPEG2017/m41463, Oct. 2017, 12 pages.

Wang, Y.K.,, "Input contribution," ISO/IEC JTC1/SC29/WG11 MPEG2017/M40373, Apr. 2017, 3 pages.

Qualcomm Incorporated, "[Systems plenary]: On MIME type parameters," SO/IEC JTC1/SC29/WG11MPEG2017/M40373, Apr. 2017, Hobart, Australia, 6 pages.

Document: JCTVC-AC1005-v2, Boyce, J., et al., "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11, 29th Meeting: Macao, CN, Oct. 19-25, 2017, 56 pages.

Document: JCTVC-AD1005-v1, Boyce, J., et al., "Additional Supplemental Enhancement Information for HEVC (Draft 1)," Joint Collaborative Team on Video Coding (JCT-VC) of ITU-T SG 16 WP 3 and ISO/IEC JTC 1/SC 29/WG 11, 30th Meeting: Gwangju, KR, Jan. 20-26, 2018, 13 pages.

"Line Transmission of Non-Telephone Signals Video Codec for Audiovisual Services at p x 64 kbits," ITU-T Recommendation H.261, Mar. 1993, 29 pages.

"Transmission of Non-Telephone Signals; Information Technology—Generic Coding of Moving Pictures and Associated Audio Information: Video," ITU-T Recommendation H.262, Jul. 1995, 211 pages.

"Series H: Audiovisual and Multimedia Systems; Infrastructure of audiovisual services—Coding of moving video; Video coding for low bit rate communication," ITU-T Recommendation H.263, Jan. 2005, 226 pages.

"Series H: Audiovisual and Multimedia Systems; Infrastructure of audiovisual services—Coding of moving video; Advanced video coding for generic audiovisual services," Recommendation ITU-T H.264, Jun. 2019, 836 pages.

"Series H: Audiovisual and Multimedia Systems; Infrastructure of audiovisual services—Coding of moving video; High efficiency video coding" Recommendation ITU-T H.265, Apr. 2013, 317 pages.

\* cited by examiner

SIGNALING A CANCEL FLAG IN A VIDEO BITSTREAM

CROSS-REFERENCE TO RELATED APPLICATIONS

This application is a continuation of International Application No. PCT/US2019/018573 filed on Feb. 19, 2019, by Futurewei Technologies, Inc., and titled "Signaling A Cancel Flag In A Video Bitstream," which claims the benefit of U.S. Provisional Patent Application No. 62/645,922, filed Mar. 21, 2018 by Ye-Kui Wang and titled "Signaling Of Omnidirectional Fisheye Video Property In A Video Bitstream," which is hereby incorporated by reference.

TECHNICAL FIELD

The present disclosure is generally related to video coding, and is specifically related to video coding in the context of virtual reality.

BACKGROUND

Virtual reality (VR) is the ability to be virtually present in a non-physical world created by the rendering of natural and/or synthetic images and sounds correlated by the movements of the immersed user allowing the user to interact with that world. With the recent progress made in rendering devices, such as head mounted displays (HMD) and VR video (often also referred to as 360 degree video or omnidirectional video) creation, a significant quality of experience can be offered. VR applications include gaming, training, education, sports video, online shopping, adult entrainment, and so on.

SUMMARY

An aspect relates to a coding implemented by a video encoder. The method includes encoding a fisheye video information supplemental enhancement information (SEI) message for any picture of a coded layer-wise video sequence (CLVS) of a particular layer into a bitstream to indicate that no equirectangular projection SEI message or cubemap projection message is present for any picture of the CLVS; and transmitting the bitstream to a video decoder.

An aspect relates to a coding implemented by a video decoder. The method includes receiving an encoded bitstream containing a fisheye video information supplemental enhancement information (SEI) message for any picture of a coded layer-wise video sequence (CLVS) of a particular layer, a presence of the fisheye video information SEI message indicating that no equirectangular projection SEI message or cubemap projection message is present for any picture of the CLVS; and decoding the encoded bitstream.

The methods facilitate signaling techniques that prevent both the omnidirectional fisheye SEI message and the frame packing indication SEI message for a picture from being included in the CLVS at the same time. The signaling techniques are also able to prevent both the omnidirectional fisheye SEI message and the projection indication SEI message for a picture from being used at the same time for a picture. In addition, the signaling techniques use a cancel flag and a persistency flag to permit different fisheye video properties to be applied to different pictures within a coded video sequence in a dynamic fashion. This provides numerous advantages, such as more optimization space and potentially a better user experience.

In a first implementation form of the method according to the aspect as such, the fisheye video information SEI message is present in a first picture of the CLVS.

An aspect relates to a coding implemented by a video encoder. The method includes encoding a frame packing arrangement supplemental enhancement information (SEI) message with a frame_packing_arrangement_cancel_flag equal to zero or a segmented rectangular frame packing arrangement SEI message with a segmented_rect_frame_packing_arrangement_cancel_flag equal to zero that applies to a picture into a bitstream to indicate that an omnidirectional fisheye video information SEI message with a fisheye_cancel_flag equal to zero that applies to the picture is not present; and transmitting the bitstream to a video decoder. Decoders shall ignore omnidirectional fisheye SEI messages when a frame packing arrangement SEI message with frame_packing_arrangement_cancel_flag equal to 0 that applies to the picture is present.

An aspect relates to a coding implemented by a video decoder. The method includes receiving an encoded bitstream containing a frame packing arrangement supplemental enhancement information (SEI) message with a frame_packing_arrangement_cancel_flag equal to zero or a segmented rectangular frame packing arrangement SEI message with a segmented_rect_frame_packing_arrangement_cancel_flag equal to zero that applies to a picture to indicate that a fisheye video information SEI message with a fisheye_cancel_flag equal to zero that applies to the picture is not present; and decoding the encoded bitstream.

The methods facilitate signaling techniques that prevent both the omnidirectional fisheye SEI message and the frame packing indication SEI message for a picture from being included in the CLVS at the same time. The signaling techniques are also able to prevent both the omnidirectional fisheye SEI message and the projection indication SEI message for a picture from being used at the same time for a picture. In addition, the signaling techniques use a cancel flag and a persistency flag to permit different fisheye video properties to be applied to different pictures within a coded video sequence in a dynamic fashion. This provides numerous advantages, such as more optimization space and potentially a better user experience.

A first aspect relates to a method of coding implemented by a video encoder. The method includes encoding a representation of video data into a bitstream, the bitstream being prohibited from including a fisheye supplemental enhancement information (SEI) message and one of a projection indication SEI message and a frame packing indication SEI message that both apply to any particular coded picture in the bitstream; and transmitting the bitstream to the video decoder.

A second aspect relates to a method of coding implemented by a video decoder. The method includes receiving an encoded bitstream containing a representation of video data, the bitstream being prohibited from including an omnidirectional fisheye supplemental enhancement information (SEI) message and one of a projection indication SEI message and a frame packing indication SEI message that both apply to any particular coded picture in the bitstream; and decoding the encoded bitstream.

The methods facilitate signaling techniques that prevent both the omnidirectional fisheye SEI message and the frame packing indication SEI message for a picture from being included in the CLVS at the same time. The signaling techniques are also able to prevent both the omnidirectional fisheye SEI message and the projection indication SEI message for a picture from being used at the same time for a picture. In addition, the signaling techniques use a cancel flag and a persistency flag to permit different fisheye video properties to be applied to different pictures within a coded video sequence in a dynamic fashion. This provides numerous advantages, such as more optimization space and potentially a better user experience.

In a first implementation form of the method according to the first or second aspect as such, the representation of video data in the bitstream contains fisheye omnidirectional video pictures.

In a second implementation form of the method according to the first or second aspect as such or any preceding implementation form of the first or second aspect, the projection indication SEI message comprises an equirectangular projection SEI message.

In a third implementation form of the method according to the first or second aspect as such or any preceding implementation form of the first or second aspect, the projection indication SEI message comprises a cubemap projection SEI message.

In a fourth implementation form of the method according to the first or second aspect as such or any preceding implementation form of the first or second aspect, the frame packing indication SEI message comprises a frame packing arrangement SEI message.

In a fifth implementation form of the method according to the first or second aspect as such or any preceding implementation form of the first or second aspect, the frame packing indication SEI message comprises a segmented rectangular frame packing arrangement SEI message.

A third aspect relates to a method of coding video information. The method comprises identifying a current picture to be a fisheye omnidirectional video picture containing a number of active areas captured by fisheye camera lens; and determining that the current picture is not allowed to be a projected omnidirectional video picture or a frame-packed video picture based on the current picture being identified as the fisheye omnidirectional video picture.

A fourth aspect relates to a method of coding video information. The method comprises identifying a current picture as something other than a fisheye omnidirectional video picture containing a number of active areas captured by fisheye camera lens; and determining that the current picture is allowed to be a projected omnidirectional video picture based on the current picture being identified as something other than the fisheye omnidirectional video picture.

A fifth aspect relates to a method of coding video information. The method comprises identifying a current picture as something other than a fisheye omnidirectional video picture containing a number of active areas captured by fisheye camera lens; and determining that the current picture is allowed to be a frame-packed video picture based on the current picture being identified as something other than the fisheye omnidirectional video picture.

The methods facilitate signaling techniques that prevent both the omnidirectional fisheye SEI message and the frame packing indication SEI message for a picture from being included in the CLVS at the same time. The signaling techniques are also able to prevent both the omnidirectional fisheye SEI message and the projection indication SEI message for a picture from being used at the same time for a picture. In addition, the signaling techniques use a cancel flag and a persistency flag to permit different fisheye video properties to be applied to different pictures within a coded video sequence in a dynamic fashion. This provides numerous advantages, such as more optimization space and potentially a better user experience.

In a first implementation form of the method according to the third, fourth, or fifth aspect as such, the current picture is identified as the fisheye omnidirectional video picture by an omnidirectional fisheye supplemental enhancement information (SEI) message.

In a second implementation form of the method according to the third, fourth, or fifth aspect as such or any preceding implementation form of the third, fourth, or fifth aspect, the current picture is identified as something other than the fisheye omnidirectional video picture by a supplemental enhancement information (SEI) message.

In a third implementation form of the method according to the third, fourth, or fifth aspect as such or any preceding implementation form of the third, fourth, or fifth aspect, the current picture is identified as something other than the fisheye omnidirectional video picture by an equirectangular projection SEI message.

In a fourth implementation form of the method according to the third, fourth, or fifth aspect as such or any preceding implementation form of the third, fourth, or fifth aspect, the current picture identified as something other than the fisheye omnidirectional video picture by a cubemap projection SEI message.

A sixth aspect relates to a method of coding video information. The method comprises prohibiting a video encoder from encoding a current picture in a coded video sequence of a bitstream with two supplemental enhancement information (SEI) messages; encoding the current picture in a coded video sequence of a bitstream; and transmitting the bitstream to a video decoder for rendering of the current picture.

The method facilitates signaling techniques that prevent both the omnidirectional fisheye SEI message and the frame packing indication SEI message for a picture from being included in the CLVS at the same time. The signaling techniques are also able to prevent both the omnidirectional fisheye SEI message and the projection indication SEI message for a picture from being used at the same time for a picture. In addition, the signaling techniques use a cancel flag and a persistency flag to permit different fisheye video properties to be applied to different pictures within a coded video sequence in a dynamic fashion. This provides numerous advantages, such as more optimization space and potentially a better user experience.

In a first implementation form of the method according to the sixth aspect as such, one of the two SEI messages is an omnidirectional fisheye SEI message.

In a second implementation form of the method according to the sixth aspect as such or any preceding implementation form of the sixth aspect, the two SEI messages are an omnidirectional fisheye SEI message and a frame packing indication SEI message.

In a third implementation form of the method according to the sixth aspect as such or any preceding implementation form of the sixth aspect, the two SEI messages are an omnidirectional fisheye SEI message and a projection indication SEI message.

A seventh aspect relates to a coding apparatus that includes a receiver configured to receive a picture to encode or to receive a bitstream to decode, a transmitter coupled to the receiver, the transmitter configured to transmit the bitstream to a decoder or to transmit a decoded image to a display, a memory coupled to at least one of the receiver or the transmitter, the memory configured to store instructions, and a processor coupled to the memory, the processor configured to execute the instructions stored in the memory to perform the method of any of the preceding aspects or implementations.

The coding apparatus facilitates signaling techniques that prevent both the omnidirectional fisheye SEI message and the frame packing indication SEI message for a picture from being included in the CLVS at the same time. The signaling techniques are also able to prevent both the omnidirectional fisheye SEI message and the projection indication SEI message for a picture from being used at the same time for a picture. In addition, the signaling techniques use a cancel flag and a persistency flag to permit different fisheye video properties to be applied to different pictures within a coded video sequence in a dynamic fashion. This provides numerous advantages, such as more optimization space and potentially a better user experience.

In a first implementation form of the apparatus according to the seventh aspect as such, the apparatus further includes a display configured to display an image.

An eighth aspect relates to a system that includes an encoder and a decoder in communication with the encoder. The encoder or the decoder includes the coding apparatus of any of the preceding aspects or implementations.

The system facilitates signaling techniques that prevent both the omnidirectional fisheye SEI message and the frame packing indication SEI message for a picture from being included in the CLVS at the same time. The signaling techniques are also able to prevent both the omnidirectional fisheye SEI message and the projection indication SEI message for a picture from being used at the same time for a picture. In addition, the signaling techniques use a cancel flag and a persistency flag to permit different fisheye video properties to be applied to different pictures within a coded video sequence in a dynamic fashion. This provides numerous advantages, such as more optimization space and potentially a better user experience.

A ninth aspect relates to a means for coding that includes receiving means configured to receive a picture to encode or to receive a bitstream to decode, transmission means coupled to the receiving means, the transmission means configured to transmit the bitstream to a decoder or to transmit a decoded image to a display means, storage means coupled to at least one of the receiving means or the transmission means, the storage means configured to store instructions, and processing means coupled to the storage means, the processing means configured to execute the instructions stored in the storage means to perform the methods in any of the preceding aspects or implementations.

The means for coding facilitates signaling techniques that prevent both the omnidirectional fisheye SEI message and the frame packing indication SEI message for a picture from being included in the CLVS at the same time. The signaling techniques are also able to prevent both the omnidirectional fisheye SEI message and the projection indication SEI message for a picture from being used at the same time for a picture. In addition, the signaling techniques use a cancel flag and a persistency flag to permit different fisheye video properties to be applied to different pictures within a coded video sequence in a dynamic fashion. This provides numerous advantages, such as more optimization space and potentially a better user experience.

The features disclosed herein may be utilized to improve the performance of VR video systems, e.g., by using viewport dependent projection mapping or viewport dependent video coding. The performance improvement can be either or both of lower transmission bandwidth and lower decoding complexity compared to conventional VR video systems under the same resolution/quality of the video part presented to the user.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
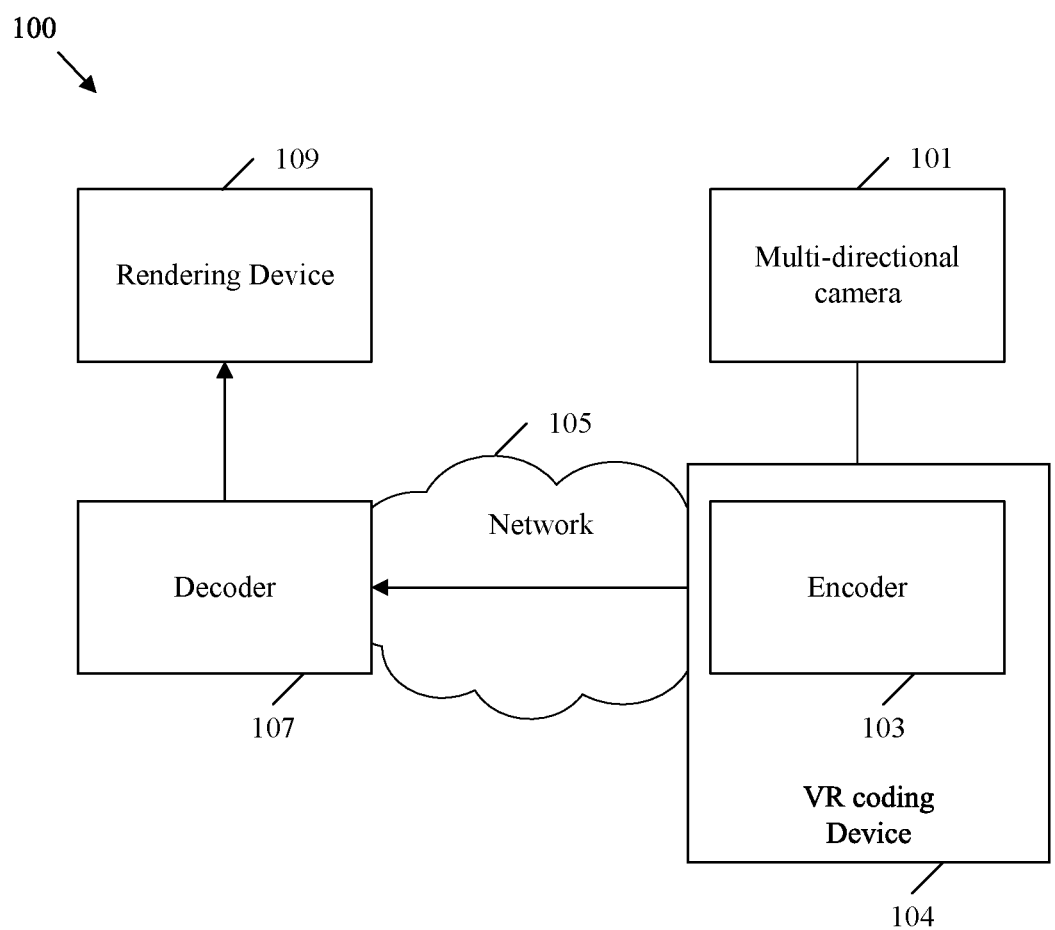
FIG. 1 is a schematic diagram of an example system for VR based video coding.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video coding standards include International Telecommunications Union Telecommunication Standardization Sector (ITU-T) H.261, International Organization for Standardization (ISO)/International Electrotechnical Commission (IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC), and Multiview Video Coding plus Depth (MVC+D), and 3D AVC (3D-AVC). HEVC includes extensions such as Scalable HEVC (SHVC), Multiview HEVC (MV-HEVC), and three dimensional (3D) HEVC (3D-HEVC).

A distinct feature of VR video compared to normal video is that, in VR typically only a subset of the entire video region represented by the video pictures, corresponding to the current field of view (FOV), i.e., the area currently being seen by the user, is displayed, while in normal video applications typically the entire video region is displayed. FOV is sometimes also referred to as viewport. This feature may be utilized to improve the performance of VR video systems, e.g., by using viewport dependent projection mapping or viewport dependent video coding. The performance improvement can be either or both of lower transmission bandwidth and lower decoding complexity compared to conventional VR video systems under the same resolution/quality of the video part presented to the user.

A VR system may also use fisheye omnidirectional video instead of projected omnidirectional video. In a VR system of fisheye omnidirectional video, the video is captured by a fisheye camera set that comprises multiple individual fisheye cameras pointing in different directions and ideally collectively covering all viewing directions around the camera set. Instead of image stitching and projection at the encoder side, the circular video pictures taken by fisheye cameras are directly placed on a two dimensional (2D) rectangular picture for each time instance. Other steps, for video coding, storage, transmission, and rendering, are similar to those used for projected omnidirectional video.

A standard named Omnidirectional Media Format (OMAF) has recently been developed by MPEG. OMAF is expected to be published as ISO/IEC International Standard 23090 Part 2. OMAF specifies the omnidirectional media format for coding, storage, delivery, and rendering of omnidirectional media including video, images, audio, and timed text. In an OMAF player, the user's viewing perspective is from the center of the sphere looking outward towards the inside surface of the sphere. OMAF supports both projected omnidirectional video and fisheye omnidirectional video.

The signaling of omnidirectional video metadata in a video bitstream is discussed. A recent amendment to HEVC is specified in the Joint Collaborative Team on Video Coding (JCT-VC) output document JCTVC-AC1005, J. Boyce, A. Ramasubramanian, R. Skupin, G. J. Sullivan, A. Tourapis, Y. -K. Wang (editors), "HEVC Additional Supplemental Enhancement Information (Draft 4)," Oct. 24, 2017. This HEVC amendment includes the specification of some supplemental enhancement information (SEI) messages for signaling of omnidirectional video metadata that is needed for proper rendering of omnidirectional video. Omnidirectional video is also often referred to as 360 degree video or VR video. Five types of SEI messages are specified in JCTVC-AC1005 for signaling of omnidirectional video metadata, namely the equirectangular projection SEI message, the cubemap projection SEI message, the sphere rotation SEI message, the region-wise packing SEI message, and the omnidirectional viewport SEI message.

In JCTVC-AC1005, the semantics of the syntax element general_non_packed_constraint_flag are specified as follows:

general_non_packed_constraint_flag equal to 1 specifies that there are no frame packing arrangement SEI messages, segmented rectangular frame packing arrangement SEI messages, equirectangular projection SEI messages, or cubemap projection SEI messages present in the coded video sequence (CVS). general_non_packed_constraint_flag equal to 0 indicates that there may or may not be one or more frame packing arrangement SEI messages, segmented rectangular frame packing arrangement SEI messages, equirectangular projection SEI messages, or cubemap projection SEI messages present in the CVS.

NOTE 2—Decoders may ignore the value of general_non_packed_constraint_flag, as there are no decoding process requirements associated with the presence or interpretation of frame packing arrangement SEI messages, segmented rectangular frame packing arrangement SEI messages, equirectangular projection SEI messages, or cubemap projection SEI messages present in the CVS.

The above semantics of general_non_packed_constraint_flag ensures that, when general_non_packed_constraint_flag is equal to 1, the CVS is a part of a "normal" video bitstream without using any frame packing arrangement scheme or any omnidirectional video projection scheme, hence a "normal" decoder that has no support of special post-decoder rendering operations such as frame de-packing or inverse of omnidirectional video projection would be able to properly render the video. This information would be useful for systems as the syntax element general_non_packed_constraint_flag is carried in a special part of a parameter set, and this special parameter set part is usually accessible by system functionalities that perform content selection and session negotiation.

A latest draft amendment to HEVC is specified in the JCT-VC output document JCTVC-AD1005, J. Boyce, H. -M. Oh, G. J. Sullivan, A. Tourapis, Y. -K. Wang (editors), "Additional Supplemental Enhancement Information for HEVC (Draft 1)," March, 2018. JCTVC-AD1005 includes a specification of the omnidirectional fisheye SEI message. The presence of the omnidirectional fisheye SEI message in a coded layer-wise video sequence (CLVS) indicates that each coded video picture in the CLVS is a fisheye omnidirectional video picture containing a number of active areas captured by fisheye camera lens. The information of the fisheye omnidirectional video carried in the omnidirectional fisheye SEI message can be used by a receiver to properly render the fisheye omnidirectional video. It is specified that the omnidirectional fisheye SEI message applies to the CLVS that contains the SEI message (also referred to as the current CLVS), and when present in a CLVS the omnidirectional fisheye SEI message shall be present in the first access unit of the CLVS and may be present in other access units of the CLVS.

The syntax and semantics of the omnidirectional fisheye SEI message as specified in JCTVC-AD1005 are copied below for convenience.

| Omnidirectional fisheye SEI message syntax | |
|---|---|
| | Descriptor |
| onmi_fisheye( payloadSize) { | |
|     omfy_view_dimension_idc | u(3) |
|     omfy_reserved_zero_5bits | u(5) |
|     omfy_num_active_areas_minus1 | u(8) |
|     for( i = 0; i <= omfy_num_active_areas_minus1; i++) { | |
|         omfy_circular_region_centre_x[ i ] | u(32) |
|         onify_circular_region_centre_y [i ] | u(32) |
|         omfy_rect_region_top[ i ] | u(32) |
|         omfy_rect_region_left[ i ] | u(32) |
|         omfy_rect_region_width[ i ] | u(32) |
|         omfy_rect_region_height[ i ] | u(32) |
|         omfy_circular_region_radius[ i ] | u(32) |
|         omfy_scene_radius[ i ] | u(32) |
|         omfy_camera_centre_azimuth[ i ] | i(32) |
|         omfy_camera_centre_elevation[ i ] | i(32) |
|         omfy_camera_centre_tilt[ i ] | i(32) |
|         omfy_camera_centre_offset_x[ i ] | u(32) |
|         omfy_camera_centre_offset_y[ i ] | u(32) |
|         omfy_camera_centre_offset_z[ i ] | u(32) |
|         omfy_field_of_view[ i ] | u(32) |
|         omfy_num_polynomial_coeffs[ i ] | u(16) |
|         for( j = 0; j < omfy_num_polynomial_coeffs[ i ];j++) | |
|             omfy_polynomial_coeff [i ][ j ] | i(32) |
|     } | |
| } | | omfy_view_dimension_idc indicates alignment and viewing direction of fisheye lens, as follows:

omfy_view_dimension_idc equal to 0 indicates that omfy_num_active_areas is equal to 2, and the values of omfy_camera_centre_azimuth, omfy_camera_centre_elevation, omfy_camera_centre_tilt, omfy_camera_ centre_offset_x, omfy_camera_centre_offset_y, and omfy_camera_centre_offset_z are such that the active areas have aligned optical axes and face opposite directions, and the sum of omfy_field_of_view values is greater than or equal to $360*2^{16}$.

omfy_view_dimension_idc equal to 1 indicates that omfy_num_active_areas is equal to 2, and the values of omfy_camera_centre_azimuth, omfy_camera_centre_elevation, omfy_camera_centre_tilt, omfy_camera_ centre_offset_x, omfy_camera_centre_offset_y, and omfy_camera_centre_offset_z are such that the active areas have parallel optical axes that are orthogonal to the line intersecting the camera centre points, and the camera corresponding to i equal to 0 is the left view.

omfy_view_dimension_idc equal to 2 indicates that omfy_num_active_areas is equal to 2, and the values of omfy_camera_centre_azimuth, omfy_camera_centre_elevation, omfy_camera_centre_tilt, omfy_camera_ centre_offset_x, omfy_camera_centre_offset_y, and omfy_camera_centre_offset_z are such that the active areas have parallel optical axes that are orthogonal to the line intersecting the camera centre points, and the camera corresponding to i equal to 0 is the right view.

omfy_view_dimension_idc equal to 7 indicates that no additional constraints are implied for the syntax element values within the omnidirectional fisheye SEI message.

Values of omfy_view_dimension_idc in the range of 3 to 6, inclusive, are reserved for future use by ITU-T|ISO/IEC. Decoders encountering a value of omfy_view_dimension_idc in the range of 3 to 6, inclusive, shall ignore it.

omfy_reserved_zero_5bits shall be equal to 0 in bitstreams conforming to this version of this specification. Other values for omfy_reserved_zero_5bits are reserved for future use by ITU-T|ISO/IEC. Decoders shall ignore the value of omfy_reserved_zero_5bits.

omfy_num_active_areas_minus1 plus 1 specifies the number of active areas in the coded picture. The value of omfy_num_active_areas_minus1 shall be in the range of 0 to 3, inclusive. Values of omfy_num_active_areas_minus1 greater than 3 are reserved for future use by ITU-T|ISO/IEC. Decoders encountering an omnidirectional fisheye SEI message with omfy_num_active_areas_minus1 greater than 3 shall ignore the omnidirectional fisheye SEI message.

omfy_circular_region_centre_x[i] and omfy_circular_region_centre_y[i] specify the horizontal and vertical coordinates of the centre of the circular region that contains the i-th active area in the coded picture, respectively, in units of 2-16 luma samples. The value of omfy_circular_region_centre_x [i] and omfy_circular_region_centre_y[i] shall be in the range of 0 to 65 536*216−1 (i.e., 4 294 967 295), inclusive.

omfy_rect_region_top[i], omfy_rect_region_left[i], omfy_rect_region_width[i], and omfy_rect_region_height [i] specify the coordinates of the top-left corner and the width and height of the i-th rectangular region that contains the i-th active area. These values are specified in units of luma samples.

omfy_circular_region_radius[i] specifies the radius of the circular region that contains the i-th active area that is defined as a length from the centre of the circular region specified by omfy_circular_region_centre_x[i] and omfy_ circular_region_centre_y[i] to the outermost pixel boundary of the circular region, in units of 2-16 luma samples, that corresponds to the maximum field of view of the i-th fisheye lens, specified by omfy_field_of_view[i]. The value of omfy_circular_region_radius[i] shall be in the range of 0 to 65 536*216−1 (i.e., 4 294 967 295), inclusive.

The i-th active area is defined as the intersection of the i-th rectangular region, specified by omfy_rect_region_top[i], omfy_rect_region_left[i], omfy_rect_region_width[i], and omfy_rect_region_height[i], and the i-th circular region, specified by omfy_circular_region_centre_x[i], omfy_circular_region_centre_y[i], and omfy_circular_region_radius[i].

omfy_scene_radius[i] specifies the radius of a circular region within the i-th active area in units of 2-16 luma samples, where the obstruction, such as the camera body, is not included in the region specified by omfy_circular_region_centre_x[i], omfy_circular_region_centre_y[i], and omfy_scene_radius[i]. The value of omfy_scene_radius[i] shall be less than or equal to omfy_circular_region_radius [i], and shall be in the range of 0 to 65 536*216−1 (i.e., 4 294 967 295), inclusive. The enclosed area is the suggested area for stitching as recommended by the encoder.

omfy_camera_centre_azimuth[i] and omfy_camera_centre_elevation[i] indicate the spherical coordinates that correspond to the centre of the circular region that contains the i-th active area in the cropped output picture, in units of 2-16 degrees. The value of omfy_camera_centre_azimuth[i] shall be in the range of −180*216 (i.e., −11 796 480) to 180*216−1 (i.e., 11 796 479), inclusive, and the value of omfy_camera_centre_elevation[i] shall be in the range of −90*216 (i.e., −5 898 240) to 90*216 (i.e., 5 898 240), inclusive.

omfy_camera_centre_tilt[i] indicates the tilt angle of the i-th active area of the cropped output picture, in units of 2-16 degrees. The value of omfy_camera_centre_tilt[i] shall be in the range of −180*216 (i.e., −11 796 480) to 180*216−1 (i.e., 11 796 479), inclusive.

omfy_camera_centre_offset_x[i], omfy_camera_centre_offset_y[i] and omfy_camera_centre_offset_z[i] indicate the XYZ offset values, in units of 2-16 millimeters, of the focal centre of the fisheye camera lens corresponding to the i-th active area from the focal centre origin of the overall fisheye camera configuration. The value of each of omfy_camera_centre_offset_x[i], omfy_camera_centre_offset_y[i], and omfy_camera_centre_offset_z[i] shall be in the range of 0 to 65 536*216−1 (i.e., 4 294 967 295), inclusive.

omfy_field_of_view[i] specifies the spherical domain coverage of the i-th active area in the coded picture, in units of 2-16 degrees. The value of omfy_field_of_view[i] shall be in the range of 0 to 360*216, inclusive.

omfy_num_polynomial_coeffs[i] specifies the number of polynomial coefficients corresponding to the i-th active area. The value of omfy_num_polynomial_coeffs[i] shall be in the range of 0 to 8, inclusive. Values of omfy_num_polynomial_coeffs[i] greater than 8 are reserved for future use by ITU-T|ISO/IEC. Decoders encountering an omnidirectional fisheye SEI message with omfy_num_polynomial_coeffs[i] greater than 8 shall ignore the omnidirectional fisheye SEI message.

omfy_polynomial_coeff[i][j] specifies the j-th polynomial coefficient value, in units of 2-24, of the curve function that maps the normalized distance of a luma sample from the centre of the i-th circular region to the angular value of a sphere coordinate from the normal vector of the i-th image plane. The value of omfy_polynomial_coeff[i][j] shall be in the range of −128*224 (i.e., 2 147 483 648) to 128*224−1 (i.e., 2 147 483 647), inclusive.

Currently, a bitstream may include both an omnidirectional fisheye SEI message and a frame packing indication SEI message (e.g., a frame packing arrangement SEI message or a segmented rectangular frame packing arrangement SEI message) for a picture. However, any decoder receiving such a bitstream is unable to determine how a picture that is signaled to be both an omnidirectional fisheye video picture and a frame-packed video picture should be rendered. This results in undesirable to annoying user experience.

Similarly, a bitstream may include both an omnidirectional fisheye SEI message and a projection indication SEI message (e.g., an equirectangular projection SEI message or a cubemap projection SEI message) for a picture. However, any decoder receiving such a bitstream is unable to determine how a picture that is signaled to be both an omnidirectional fisheye video picture and a projected omnidirectional video picture should be rendered. This results in undesirable to annoying user experience.

In addition, in current protocol the persistency scope of the omnidirectional fisheye SEI message is specified at the sequence level. As such, the same omnidirectional fisheye SEI message properties are applied to every picture in the coded layer-wise video sequence (CLVS) that contains that omnidirectional fisheye SEI message. This prevents different fisheye video properties from being applied to pictures within a coded video sequence in a dynamic fashion. Moreover, it would be more convenient for decoder implementations if the same persistency mechanism utilized for the equirectangular projection SEI message and the cubemap SEI message is also used for the omnidirectional fisheye SEI message.

Disclosed herein are signaling techniques and/or methods that prevent both the omnidirectional fisheye SEI message (a.k.a., fisheye video information SEI message) and the frame packing indication SEI message for a picture from being included in the CLVS at the same time. The signaling techniques and/or methods are also able to prevent both the omnidirectional fisheye SEI message and the projection indication SEI message for a picture from being used at the same time for a picture. In addition, the signaling techniques and/or methods use a cancel flag and a persistency flag to permit different fisheye video properties to be applied to different pictures within a coded video sequence in a dynamic fashion. This provides numerous advantages, such as more optimization space and potentially a better user experience.

FIG. 1 is a schematic diagram of an example system 100 for VR based video coding. System 100 includes a multi-directional camera 101, a VR coding device 104 including an encoder 103, a decoder 107, and a rendering device 109. The multi-directional camera 101 comprises an array of camera devices. Each camera device is pointed at a different angle so that the multi-directional camera 101 can take multiple directional video streams of the surrounding environment from a plurality of angles. For example, multi-directional camera 101 can take video of the environment as a sphere with the multi-directional camera 101 at the center of the sphere. As used herein, sphere and spherical video refers to both a geometrical sphere and sub-portions of a geometrical sphere, such as spherical caps, spherical domes, spherical segments, etc. For example, a multi-directional camera 101 may take one hundred and eighty degree video to cover half of the environment so that production crew can remain behind the multi-directional camera 101. A multi-directional camera 101 can also take video in three hundred sixty degrees (or any sub-portion thereof). However, a portion of the floor under the multi-directional camera 101 may be omitted, which results in video of less than a perfect sphere. Hence, the term sphere, as used herein, is a general term used for clarity of discussion and should not be considered limiting from a geometrical stand point.

Video from the multi-directional camera 101 is forwarded to the VR coding device 104. A VR coding device 104 may be a computing system including specialized VR coding software. The VR coding device 104 may include an encoder 103 (a.k.a., a video encoder). In some examples, the encoder 103 can also be included in a separate computer system from the VR coding device 104. The VR coding device 104 is configured to convert the multiple directional video streams into a single multiple directional video stream including the entire recorded area from all relevant angles. This conversion may be referred to as image stitching. For example, frames from each video stream that are captured at the same time can be stitched together to create a single spherical image. A spherical video stream can then be created from the spherical images. For clarity of discussion, it should be noted that the terms frame, picture, and image may be interchangeably herein unless specifically noted.

The spherical video stream can then be forwarded to the encoder 103 for compression. An encoder 103 is a device and/or program capable of converting information from one format to another for purposes of standardization, speed, and/or compression. Standardized encoders 103 are configured to encode rectangular and/or square images. Accordingly, the encoder 103 is configured to map each spherical image from the spherical video stream into a plurality of rectangular sub-pictures. The sub-pictures can then be placed in separate sub-picture video streams. As such, each sub-picture video stream displays a stream of images over time as recorded from a sub-portion of the spherical video stream. The encoder 103 can then encode each sub-picture video stream to compress the video stream to a manageable file size. The encoding process is discussed in more detail below. In general, the encoder 103 partitions each frame from each sub-picture video stream into pixel blocks, compresses the pixel blocks by inter-prediction and/or intra-prediction to create coding blocks including prediction blocks and residual blocks, applies transforms to the residual blocks for further compression, and applies various filters to the blocks. The compressed blocks as well as corresponding syntax are stored in bitstream(s), for example in International Standardization Organization base media file format (ISOBMFF) and/or in omnidirectional media format (OMAF).

The VR coding device 104 may store the encoded bitstream(s) in memory, locally and/or on a server, for communication to a decoder 107 on demand. The data can be forwarded via a network 105, which may include the Internet, a mobile telecommunications network (e.g., a long term evolution (LTE) based data network), or other data communication data system.

The decoder 107 (a.k.a., a video decoder) is a device on a user's location that is configured to reverse the coding process to reconstruct the sub-picture video streams from the encoded bitstream(s). The decoder 107 also merges the sub-picture video streams to reconstruct the spherical video stream. The spherical video stream, or sub-portions thereof, can then be forwarded to the rendering device 109. The rendering device 109 is a device configured to display the spherical video stream to the user. For example, the rendering device 109 may include a HMD that attached to the user's head and covers the user's eyes. The rendering device may include a screen for each eye, cameras, motion sensors, speakers, etc. and may communicate with the decoder 107 via wireless and/or wired connections. The rendering device 109 may display a sub-portion of the spherical video stream to the user. The sub-portion shown is based on the FOV and/or viewport of the rendering device. For example, the rendering device 109 may change the position of the FOV based on user head movement by employing the motion tracking sensors. This allows the user to see different portions of the spherical video stream depending on head movement. Further, the rendering device 109 may offset the FOV for each eye based on the user's interpapillary distance (IPD) to create the impression of a three dimensional space.

Figure 2:
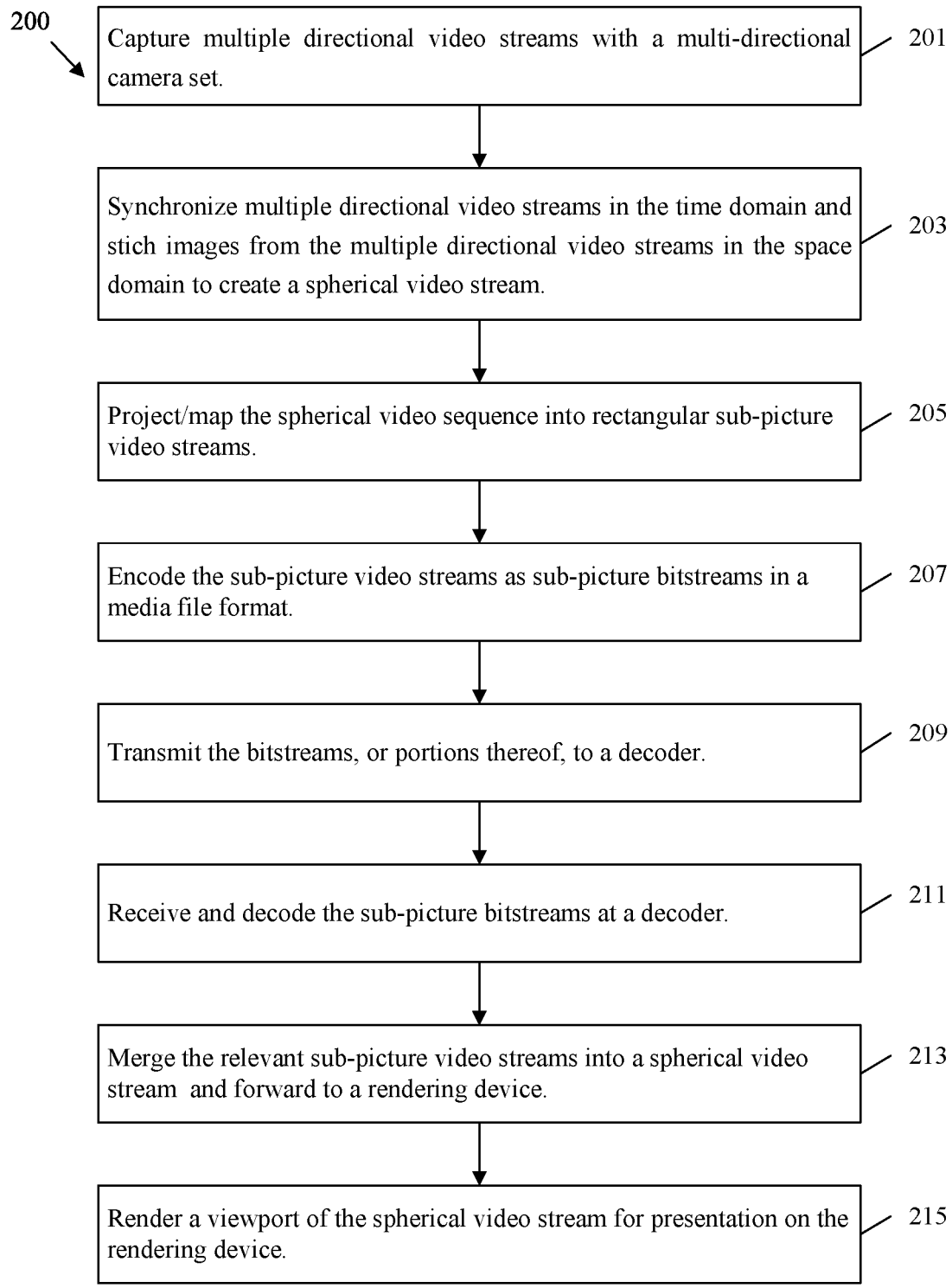
FIG. 2 is a flowchart of an example method of coding a VR picture bitstream.

FIG. 2 is a flowchart of an example method 200 of coding a VR picture bitstream as a plurality of sub-picture bitstreams, for example by employing the components of system 100. At step 201, multi-directional camera set, such as multi-directional camera 101, is used to capture multiple directional video streams. The multiple directional video streams include views of an environment at various angles. For example, the multiple directional video streams may capture video from three hundred sixty degrees, one hundred eighty degrees, two hundred forty degrees, etc. around the camera in the horizontal plane. The multiple directional video streams may also capture video from three hundred sixty degrees, one hundred eighty degrees, two hundred forty degrees, etc. around the camera in the vertical plane. The result is to create video that includes information sufficient to cover a spherical area around the camera over some period of time.

At step 203, the multiple directional video streams are synchronized in the time domain. Specifically, each directional video stream includes a series of images taken at a corresponding angle. The multiple directional video streams are synchronized by ensuring frames from each directional video stream that were captured at the same time domain position are processed together. The frames from the directional video streams can then be stitched together in the space domain to create a spherical video stream. Hence, each frame of the spherical video stream contains data taken from the frames of all the directional video streams that occur at a common temporal position.

At step 205, the spherical video stream is mapped into rectangular sub-picture video streams. This process may also be referred to as projecting the spherical video stream into rectangular sub-picture video streams. As noted above, encoders and decoders are generally designed to encode rectangular and/or square frames. Accordingly, mapping the spherical video stream into rectangular sub-picture video streams creates video streams that can be encoded and decoded by non-VR specific encoders and decoders, respectively. It should be noted that steps 203 and 205 are specific to VR video processing, and hence may be performed by specialized VR hardware, software, or combinations thereof.

At step 207, the rectangular sub-picture video streams can be forwarded to an encoder, such as encoder 103. The encoder then encodes the sub-picture video streams as sub-picture bitstreams in a corresponding media file format. Specifically, each sub-picture video stream can be treated by the encoder as a video signal. The encoder can encode each frame of each sub-picture video stream via inter-prediction, intra-prediction, etc. Such encoding and corresponding decoding as well as encoders and decoders are discussed in detail with respect to FIGS. 3-15 below. Regarding file format, the sub-picture video streams can be stored in ISOBMFF. For example, the sub-picture video streams are captured at a specified resolution. The sub-picture video streams can then be downsampled to various lower resolutions for encoding. Each resolution can be referred to as a representation of the sub-picture video stream (e.g., a portion of the video steam). Lower quality representations lose image clarity while reducing file size. Accordingly, lower quality representations can be transmitted to a user using fewer network resources (e.g., time, bandwidth, etc.) than higher quality representations with an attendant loss of visual quality. Each representation can be stored in a corresponding set of tracks. Hence, tracks can be sent to a user, where the tracks include the sub-picture bitstreams at various resolutions (e.g., visual quality).

At step 209, the sub-picture bitstreams can be sent to the decoder as tracks. In some examples, all sub-picture bitstreams are transmitted at the same quality by transmitting tracks from the same representation. The downside to this approach is that areas of the final VR video stream that are of less concern are transmitted at the same resolution as all other areas. Viewport dependent coding can be used to improve compression over such an approach. In viewport dependent coding, the tracks containing sub-picture bitstreams with data in the users FOV are sent at higher resolutions by selecting higher quality representations. Tracks containing sub-picture bitstreams with areas outside the users FOV can be sent at progressively lower resolutions by selecting lower quality representations. Some areas may even be completely omitted in some examples. For example, areas adjacent to the FOV can be sent at slightly reduced quality in case the user decided to change the FOV to include such areas. Areas farther away from the FOV can be sent at progressively lower quality as such areas are progressively more unlikely to enter the FOV and hence are progressively more unlikely to ever be rendered for the user. The tracks may include relatively short video segments (e.g., about three seconds), and hence the representations selected for particular areas of the video can change over time based on changes in FOV. This allows quality to change as the users FOV changes. Viewport dependent coding may significantly reduce the file size of the tracks sent to the user without significant losses in visual quality because the areas of reduced quality are unlikely to be seen by the user.

At step 211, a decoder, such as decoder 107, receives the tracks containing the sub-picture bitstreams. The decoder can then decode the sub-picture bitstreams into sub-picture video streams for display. The decoding process involves the reverse of the encoding process (e.g., using inter-prediction and intra-prediction), and is discussed in more detail with respect to FIGS. 3-10 below.

At step 213, the decoder can merge the sub-picture video streams into the spherical video stream for presentation to the user. Specifically, the decoder can employ a so called lightweight merging algorithm that selects frames from each sub-picture video stream that occur at the same presentation time and merges them together based on the position and/or angle associated with the corresponding sub-picture video stream. The decoder may also employ filters to smooth edges between the sub-picture video streams, remove artifacts, etc. The decoder can then forward the spherical video stream to a rendering device, such as rendering device 109.

At step 215, the rendering device renders a viewport of the spherical video stream for presentation to the user. As mentioned above, areas of the spherical video stream outside of the FOV at each point in time are not rendered. Hence, in viewport dependent coding, lower quality representations are effectively omitted, and hence the reduction in viewing quality has a negligible impact on user experience while reducing file size.

Figure 3:
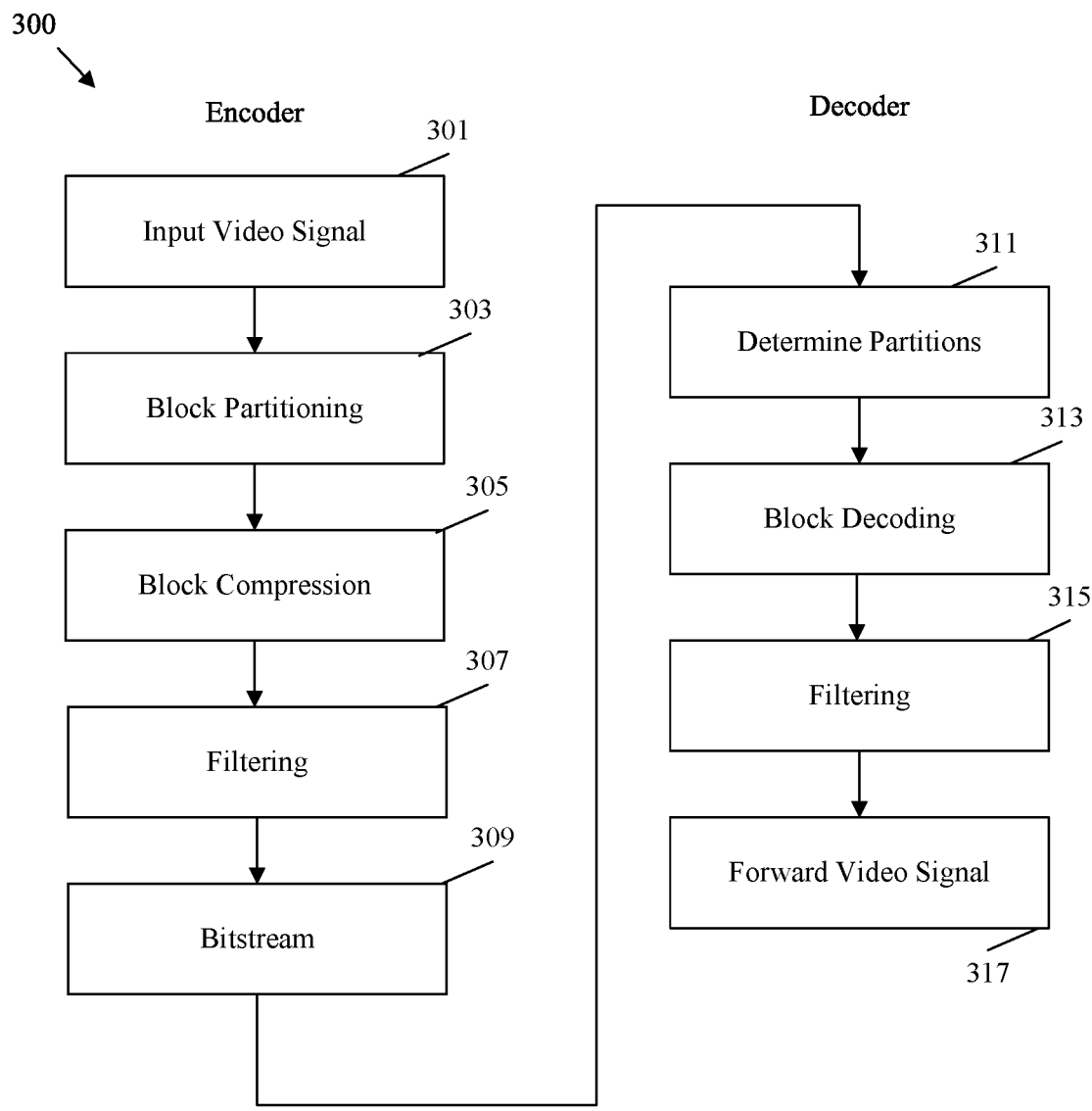
FIG. 3 is a flowchart of an example method of coding a video signal.

FIG. 3 is a flowchart of an example method 300 of coding a video signal including a sub-picture video stream. For example, method 300 may receive a plurality of sub-picture video streams from step 205 of method 200. Method 300 treats each sub-picture video stream as a video signal input. Method 300 applies steps 301-317 to each sub-picture video stream in order to implement steps 207-211 of method 200. Hence, the output video signal from method 300 includes the decoded sub-picture video streams, which can be merged and displayed according to steps 213 and 215 of method 200.

Method 300 encodes a video signal, for example including sub-picture video streams, at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 301, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples).

At step 303, the video signal is partitioned into blocks. Partitioning includes subdividing the pixels in each frame into square and/or rectangular blocks for compression. For example, in HEVC (also known as H.265 and MPEG-H Part 2) the frame can first be divided into coding tree units (CTUs), which are blocks of a predefined size (e.g., sixty four pixels by sixty four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 305, various compression mechanisms are employed to compress the image blocks partitioned at step 303. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement, or lack thereof. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 307, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 309. The bitstream includes the data discussed above as well as any signaling data (e.g., syntax) desired to support proper video signal reconstruction at the decoder. For example, such data may include partition data, prediction data, residual blocks, and various flags providing coding instructions to the decoder. The bitstream may be stored in memory for transmission toward a decoder upon request, for example as a track and/or track fragment in ISOBMFF. The bitstream may also be broadcast and/or multicast toward a plurality of decoders. The creation of the bitstream is an iterative process. Accordingly, steps 301, 303, 305, 307, and 309 may occur continuously and/or simultaneously over many frames and blocks. The order shown in FIG. 3 is presented for clarity and ease of discussion, and is not intended to limit the video coding process to a particular order.

The decoder receives the bitstream and begins the decoding process at step 311. For example, the decoder can employ an entropy decoding scheme to convert the bitstream into corresponding syntax and video data. The decoder employs the syntax data from the bitstream to determine the partitions for the frames at step 311. The partitioning should match the results of block partitioning at step 303. Entropy encoding/decoding, which may be employed in step 311, is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 313, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 305. The reconstructed image blocks are then positioned into frames of a reconstructed video signal according to the partitioning data determined at step 311. Syntax for step 313 may also be signaled in the bitstream via entropy coding as discussed above.

At step 315, filtering is performed on the frames of the reconstructed video signal in a manner similar to step 307 at the encoder. For example, noise suppression filters, de-blocking filters, adaptive loop filters, and SAO filters may be applied to the frames to remove blocking artifacts. Once the frames are filtered, the video signal can be forwarded for merging at step 317 and then output to a display, such as a HMD, for viewing by an end user.

Figure 4:
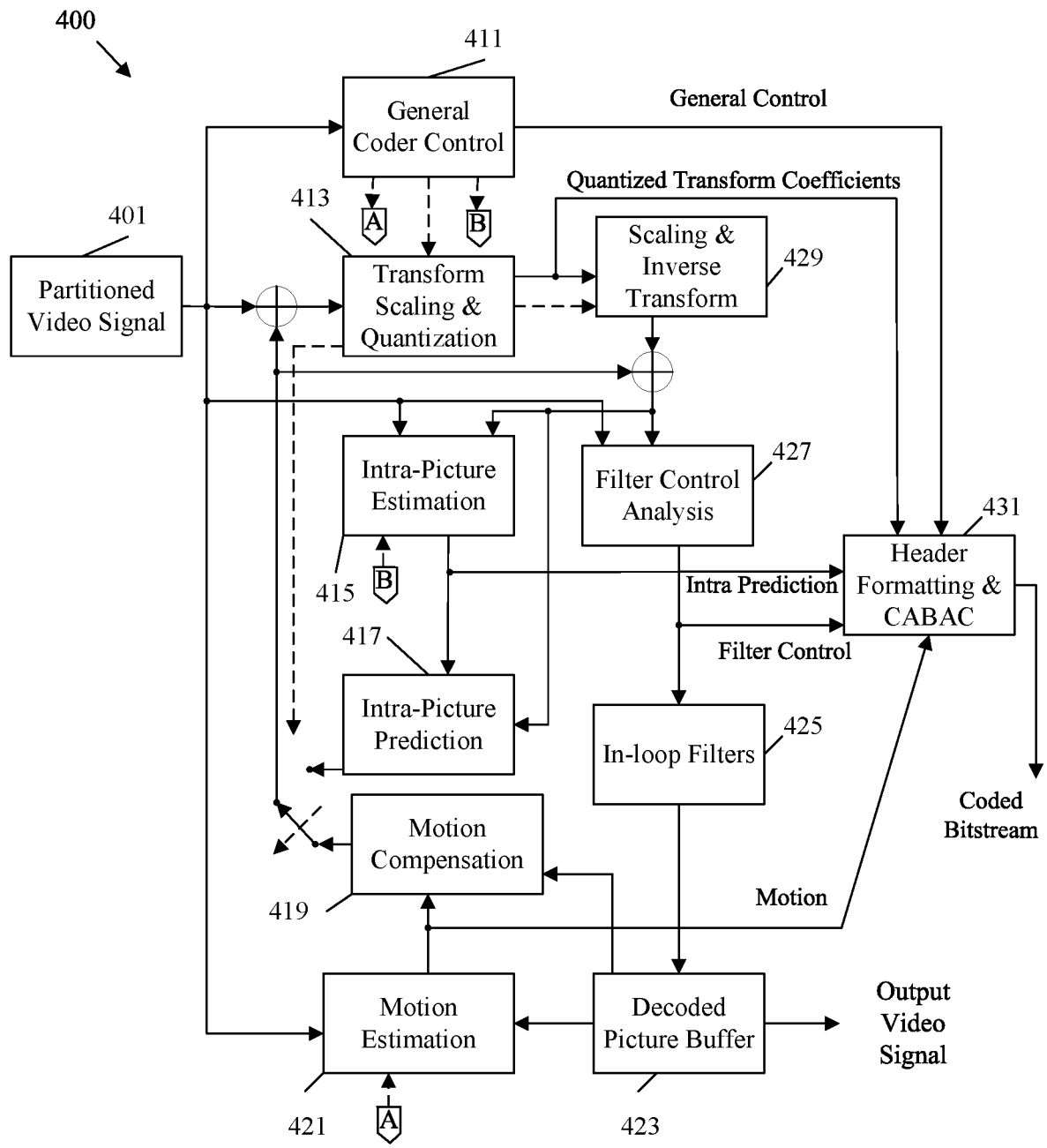
FIG. 4 is a schematic diagram of an example coding and decoding (codec) system for video coding.

FIG. 4 is a schematic diagram of an example coding and decoding (codec) system 400 for video coding. Specifically, codec system 400 provides functionality to support encoding and decoding sub-picture video streams according to methods 200 and 300. Further, codec system 400 can be employed to implement an encoder 103 and/or a decoder 107 of system 100.

Codec system 400 is generalized to depict components employed in both an encoder and a decoder. Codec system 400 receives and partitions frames form a video signal (e.g., including a sub-picture video stream) as discussed with respect to steps 301 and 303 in operating method 300, which results in a partitioned video signal 301. Codec system 400 then compresses the partitioned video signal 401 into a coded bitstream when acting as an encoder as discussed with respect to steps 305, 307, and 309 in method 300. When acting as a decoder, codec system 400 generates an output video signal from the bitstream as discussed with respect to steps 311, 313, 315, and 317 in operating method 300. The codec system 400 includes a general coder control component 411, a transform scaling and quantization component 413, an intra-picture estimation component 415, an intra-picture prediction component 417, a motion compensation component 419, a motion estimation component 421, a scaling and inverse transform component 429, a filter control analysis component 427, an in-loop filters component 425, a decoded picture buffer component 423, and a header formatting and context adaptive binary arithmetic coding (CABAC) component 431. Such components are coupled as shown. In FIG. 4, black lines indicate movement of data to be encoded/decoded while dashed lines indicate movement of control data that controls the operation of other components. The components of codec system 400 may all be present in the encoder. The decoder may include a subset of the components of codec system 400. For example, the decoder may include the intra-picture prediction component 417, the motion compensation component 419, the scaling and inverse transform component 429, the in-loop filters component 425, and the decoded picture buffer component 423. These components are now described.

The partitioned video signal 401 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 401 is forwarded to the general coder control component 411, the transform scaling and quantization component 413, the intra-picture estimation component 415, the filter control analysis component 427, and the motion estimation component 421 for compression.

The general coder control component 411 is configured to make decisions related to coding of the images of the video sequence into the bitstream according to application constraints. For example, the general coder control component 411 manages optimization of bitrate/bitstream size versus reconstruction quality. Such decisions may be made based on storage space/bandwidth availability and image resolution requests. The general coder control component 411 also manages buffer utilization in light of transmission speed to mitigate buffer underrun and overrun issues. To manage these issues, the general coder control component 411 manages partitioning, prediction, and filtering by the other components. For example, the general coder control component 411 may dynamically increase compression complexity to increase resolution and increase bandwidth usage or decrease compression complexity to decrease resolution and bandwidth usage. Hence, the general coder control component 411 controls the other components of codec system 400 to balance video signal reconstruction quality with bit rate concerns. The general coder control component 411 creates control data, which controls the operation of the other components. The control data is also forwarded to the header formatting and CABAC component 431 to be encoded in the bitstream to signal parameters for decoding at the decoder.

The partitioned video signal 401 is also sent to the motion estimation component 421 and the motion compensation component 419 for inter-prediction. A frame or slice of the partitioned video signal 401 may be divided into multiple video blocks. Motion estimation component 421 and the motion compensation component 419 perform inter-predictive coding of the received video block relative to one or more blocks in one or more reference frames to provide temporal prediction. Codec system 400 may perform multiple coding passes, e.g., to select an appropriate coding mode for each block of video data.

Motion estimation component 421 and motion compensation component 419 may be highly integrated, but are illustrated separately for conceptual purposes. Motion estimation, performed by motion estimation component 421, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 421 generates motion vectors, PUs, and TUs by using a rate-distortion analysis as part of a rate distortion optimization process. For example, the motion estimation component 421 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 400 may calculate values for sub-integer pixel positions of reference pictures stored in decoded picture buffer component 423. For example, video codec system 400 may interpolate values of one-quarter pixel positions, one-eighth pixel positions, or other fractional pixel positions of the reference picture. Therefore, motion estimation component 421 may perform a motion search relative to the full pixel positions and fractional pixel positions and output a motion vector with fractional pixel precision. The motion estimation component 421 calculates a motion vector for a PU of a video block in an inter-coded slice by comparing the position of the PU to the position of a predictive block of a reference picture. Motion estimation component 421 outputs the calculated motion vector as motion data to header formatting and CABAC component 431 for encoding and motion to the motion compensation component 419.

Motion compensation, performed by motion compensation component 419, may involve fetching or generating the predictive block based on the motion vector determined by motion estimation component 421. Again, motion estimation component 421 and motion compensation component 419 may be functionally integrated, in some examples. Upon receiving the motion vector for the PU of the current video block, motion compensation component 419 may locate the predictive block to which the motion vector points. A residual video block is then formed by subtracting pixel values of the predictive block from the pixel values of the current video block being coded, forming pixel difference values. In general, motion estimation component 421 performs motion estimation relative to luma components, and motion compensation component 419 uses motion vectors calculated based on the luma components for both chroma components and luma components. The predictive block and residual block are forwarded to transform scaling and quantization component 413.

The partitioned video signal 401 is also sent to intra-picture estimation component 415 and intra-picture prediction component 417. As with motion estimation component 421 and motion compensation component 419, intra-picture estimation component 415 and intra-picture prediction component 417 may be highly integrated, but are illustrated separately for conceptual purposes. The intra-picture estimation component 415 and intra-picture prediction component 417 intra-predict a current block relative to blocks in a current frame, as an alternative to the inter-prediction performed by motion estimation component 421 and motion compensation component 419 between frames, as described above. In particular, the intra-picture estimation component 415 determines an intra-prediction mode to use to encode a current block. In some examples, intra-picture estimation component 415 selects an appropriate intra-prediction mode to encode a current block from multiple tested intra-prediction modes. The selected intra-prediction modes are then forwarded to the header formatting and CABAC component 431 for encoding.

For example, the intra-picture estimation component 415 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 415 calculates ratios from the distortions and rates for the various encoded blocks to determine which intra-prediction mode exhibits the best rate-distortion value for the block. In addition, intra-picture estimation component 415 may be configured to code depth blocks of a depth map using a depth modeling mode (DMM) based on rate-distortion optimization (RDO).

The intra-picture prediction component 417 may generate a residual block from the predictive block based on the selected intra-prediction modes determined by intra-picture estimation component 415 when implemented on an encoder or read the residual block from the bitstream when implemented on a decoder. The residual block includes the difference in values between the predictive block and the original block, represented as a matrix. The residual block is then forwarded to the transform scaling and quantization component 413. The intra-picture estimation component 415 and the intra-picture prediction component 417 may operate on both luma and chroma components.

The transform scaling and quantization component 413 is configured to further compress the residual block. The transform scaling and quantization component 413 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 413 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 413 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 413 may then perform a scan of the matrix including the quantized transform coefficients. The quantized transform coefficients are forwarded to the header formatting and CABAC component 431 to be encoded in the bitstream.

The scaling and inverse transform component 429 applies a reverse operation of the transform scaling and quantization component 413 to support motion estimation. The scaling and inverse transform component 429 applies inverse scaling, transformation, and/or quantization to reconstruct the residual block in the pixel domain, e.g., for later use as a reference block which may become a predictive block for another current block. The motion estimation component 421 and/or motion compensation component 419 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 427 and the in-loop filters component 425 apply the filters to the residual blocks and/or to reconstructed image blocks. For example, the transformed residual block from the scaling and inverse transform component 429 may be combined with a corresponding prediction block from intra-picture prediction component 417 and/or motion compensation component 419 to reconstruct the original image block. The filters may then be applied to the reconstructed image block. In some examples, the filters may instead be applied to the residual blocks. As with other components in FIG. 4, the filter control analysis component 427 and the in-loop filters component 425 are highly integrated and may be implemented together, but are depicted separately for conceptual purposes. Filters applied to the reconstructed reference blocks are applied to particular spatial regions and include multiple parameters to adjust how such filters are applied. The filter control analysis component 427 analyzes the reconstructed reference blocks to determine where such filters should be applied and sets corresponding parameters. Such data is forwarded to the header formatting and CABAC component 431 as filter control data for encoding. The in-loop filters component 425 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 423 for later use in motion estimation as discussed above. When operating as a decoder, the decoded picture buffer component 423 stores and forwards the reconstructed and filtered blocks toward a display as part of an output video signal. The decoded picture buffer component 423 may be any memory device capable of storing prediction blocks, residual blocks, and/or reconstructed image blocks.

The header formatting and CABAC component 431 receives the data from the various components of codec system 400 and encodes such data into a coded bitstream for transmission toward a decoder. Specifically, the header formatting and CABAC component 431 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 401. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

As noted above, the present disclosure provides signaling techniques and/or methods that prohibit a bitstream from including an omnidirectional fisheye SEI message for a picture when the value of a general_non_packed_constraint_flag is equal to 1 in the active SPS. When a bitstream includes the omnidirectional fisheye SEI message for a picture, a video encoder sets the value of a general_non_packed_constraint_flag equal to 0 in the active SPS. As such, a video decoder knows that any bitstream containing a general_non_packed_constraint_flag equal to 1 does not contain any fisheye omnidirectional video pictures. When the video decoder receives a bitstream that contains a general_non_packed_constraint_flag equal to 0, the video decoder knows that the bitstream may contain an omnidirectional fisheye SEI message corresponding to one or more fisheye omnidirectional video pictures.

The signaling techniques and/or methods provide at least the following advantages and benefits relative to the conventional signaling techniques and methods. In particular, the disclosed embodiments may be used to avoid undesirable, annoying, or unexpected user experience, to enable a better user experience, and to reduce the implementation complexity of decoders that support handling of both projection indication SEI messages (i.e., equirectangular projection SEI messages or cubemap projection SEI messages) and omnidirectional fisheye SEI message.

To implement the signaling techniques and/or methods disclosed herein, the semantics of the syntax element general_non_packed_constraint_flag are changed as follows.

general_non_packed_constraint_flag equal to 1 specifies that there are no frame packing arrangement SEI messages, segmented rectangular frame packing arrangement SEI messages, equirectangular projection SEI messages, cubemap projection SEI messages, or omnidirectional fisheye SEI messages present in the CVS. general_non_packed_constraint_flag equal to 0 indicates that there may or may not be one or more frame packing arrangement SEI messages, segmented rectangular frame packing arrangement SEI messages, equirectangular projection SEI messages, cubemap projection SEI messages, or omnidirectional fisheye SEI messages present in the CVS.

NOTE 2—Decoders may ignore the value of general_non_packed_constraint_flag, as there are no decoding process requirements associated with the presence or interpretation of frame packing arrangement SEI messages, segmented rectangular frame packing arrangement SEI messages, equirectangular projection SEI messages, cubemap projection SEI messages, or omnidirectional fisheye SEI messages.

Figure 5:
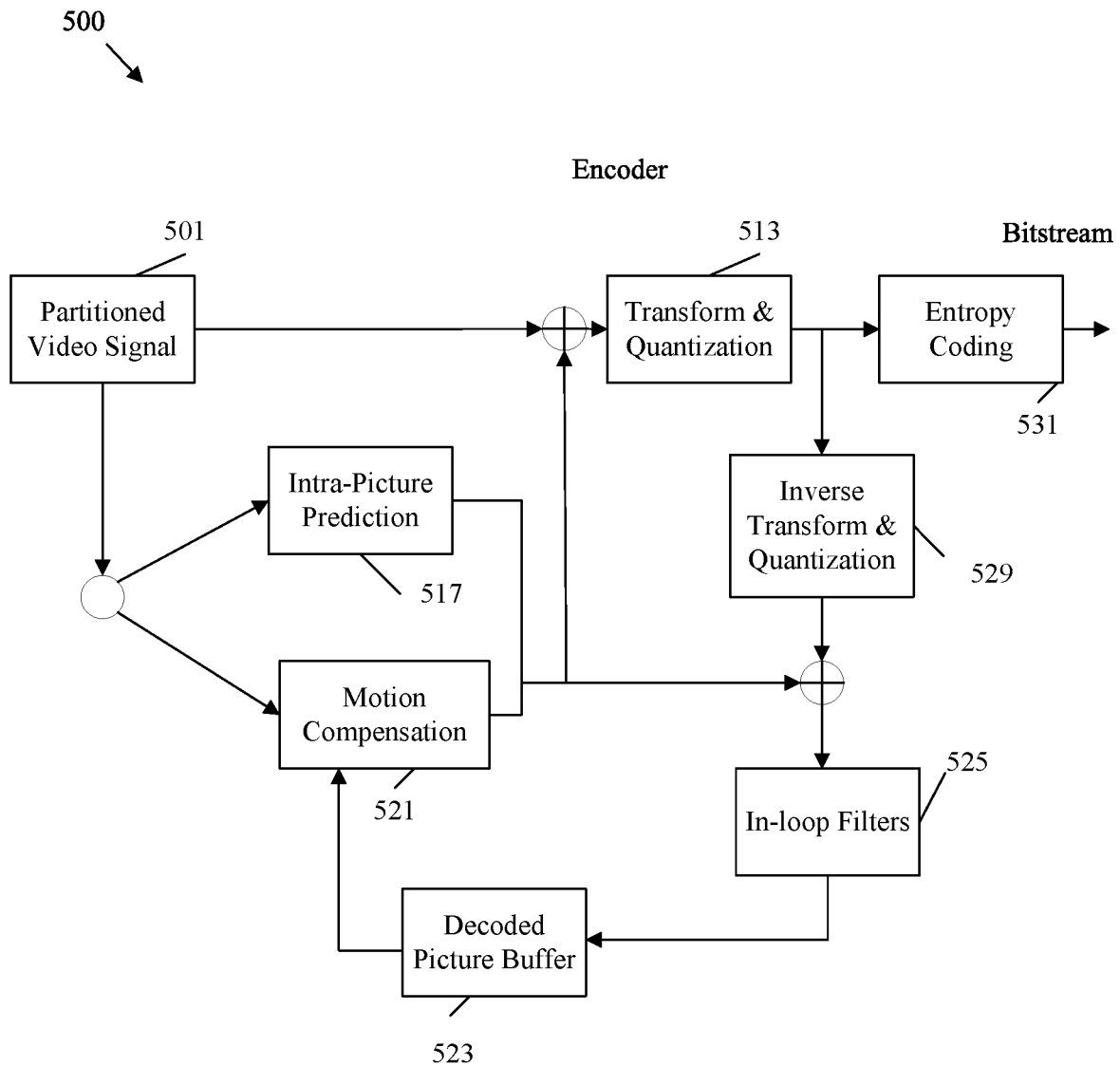
FIG. 5 is a schematic diagram illustrating an example video encoder.

FIG. 5 is a block diagram illustrating an example video encoder 500 that may encode sub-picture bitstreams. Video encoder 500 may be employed to implement the encoding functions of codec system 400 and/or implement steps 301, 303, 305, 307, and/or 309 of method 300. Further, encoder 500 may be employed to implement steps 205-209 of method 200 as well as encoder 103. Encoder 500 partitions an input video signal (e.g., a sub-picture video stream), resulting in a partitioned video signal 501, which is substantially similar to the partitioned video signal 401. The partitioned video signal 501 is then compressed and encoded into a bitstream by components of encoder 500.

Specifically, the partitioned video signal 501 is forwarded to an intra-picture prediction component 517 for intra-prediction. The intra-picture prediction component 517 may be substantially similar to intra-picture estimation component 415 and intra-picture prediction component 417. The partitioned video signal 501 is also forwarded to a motion compensation component 521 for inter-prediction based on reference blocks in a decoded picture buffer component 523. The motion compensation component 521 may be substantially similar to motion estimation component 421 and motion compensation component 419. The prediction blocks and residual blocks from the intra-picture prediction component 517 and the motion compensation component 521 are forwarded to a transform and quantization component 513 for transform and quantization of the residual blocks. The transform and quantization component 513 may be substantially similar to the transform scaling and quantization component 413. The transformed and quantized residual blocks and the corresponding prediction blocks (along with associated control data) are forwarded to an entropy coding component 531 for coding into a bitstream. The entropy coding component 531 may be substantially similar to the header formatting and CABAC component 431.

The transformed and quantized residual blocks and/or the corresponding prediction blocks are also forwarded from the transform and quantization component 513 to an inverse transform and quantization component 529 for reconstruction into reference blocks for use by the motion compensation component 521. The inverse transform and quantization component 529 may be substantially similar to the scaling and inverse transform component 429. In-loop filters in an in-loop filters component 525 are also applied to the residual blocks and/or reconstructed reference blocks, depending on the example. The in-loop filters component 525 may be substantially similar to the filter control analysis component 427 and the in-loop filters component 425. The in-loop filters component 525 may include multiple filters as discussed with respect to in-loop filters component 425. The filtered blocks are then stored in a decoded picture buffer component 523 for use as reference blocks by the motion compensation component 521. The decoded picture buffer component 523 may be substantially similar to the decoded picture buffer component 423.

The encoder 500 receives sub-picture video streams split from a spherical video stream for use in conjunction with a VR system using viewport dependent coding. As noted above, when sub-picture video streams are transmitted to a decoder at varying resolutions, artifacts can occur due to data lost in the process of reducing resolutions for the lower quality sub-picture video streams. This is because both intra-prediction and inter-prediction encode blocks based on samples (pixels) from adjacent blocks. When the references cross sub-picture video stream boundaries, the references may become inaccurate due to loss of date in an adjacent sub-picture video stream. In order to mitigate these issues, the motion compensation component 521 and the intra-picture prediction component 517 of encoder 500 encode each sub-picture video stream to be self-contained. Specifically, the motion compensation component 521 and the intra-picture prediction component 517 are configured to only reference full sample locations in the same sub-picture video stream during encoding. Specifically, when a first sub-picture video stream is being encoded, the encoder 500 is prevented from referencing sample locations from other sub-picture video streams. This applies to both intra-prediction modes and inter-prediction motion vectors. Further, the motion compensation component 521 and the intra-picture prediction component 517 may reference fractional sample locations in the first sub-picture video stream, but only when the sample at the referenced fractional sample location can be recreated by interpolation based solely on sample locations inside the first sub-picture bitstream (e.g., without reference to any other sub-picture bitstream). Further, the motion compensation component 521 may generate motion vector candidate lists for a first sub-picture bitstream when performing inter-prediction. However, the motion compensation component 521 may not include motion vectors in the candidate list when the motion vectors are from blocks in another sub-picture bitstream. These restrictions ensures that each sub-picture bitstream can be decoded without reference to a neighbor sub-picture bitstream, and hence resolution based mismatches are avoided.

Further, video coding may employ parallelization, such as WPP, to speed up the video coding process. WPP allows a current block (e.g., CTU) to be coded so long as the block above the current block and the block above and to the right of the current block have already been decoded. WPP creates the impression of a wave, with the top row of blocks being coded two blocks ahead of the second row of block, which is two blocks ahead of the third row, etc. Sub-picture bitstream frames can be treated as tiles at the decoder, and the tiles can be merged to reconstruct the spherical video stream. WPP may not be configured to operate when tiles are present, because WPP operates on an entire frame at once (e.g., the frame from the spherical video stream) and not on a tile level. Accordingly, encoder 500 can disable WPP when encoding a sub-picture bitstream. For example, a entropy_coding_sync_enabled_flag is used by WPP. The flag is included in the PPS syntax for each picture. The encoder 500 can set the entropy_coding_sync_enabled_flag to zero to disable WPP for the sub-picture video streams.

Also, the encoder 500 can avoid timing mismatch issues between the sub-picture bitstreams by encoding the sub-picture video streams in tracks and ensuring the tracks have the same presentation time. Further, the encoder 500 can ensure each sample from a common VR picture (e.g., a frame in a spherical video stream) employs the same picture order count value even when such samples are split into different sub-picture bitstreams and/or carried in different tracks.

Figure 6:
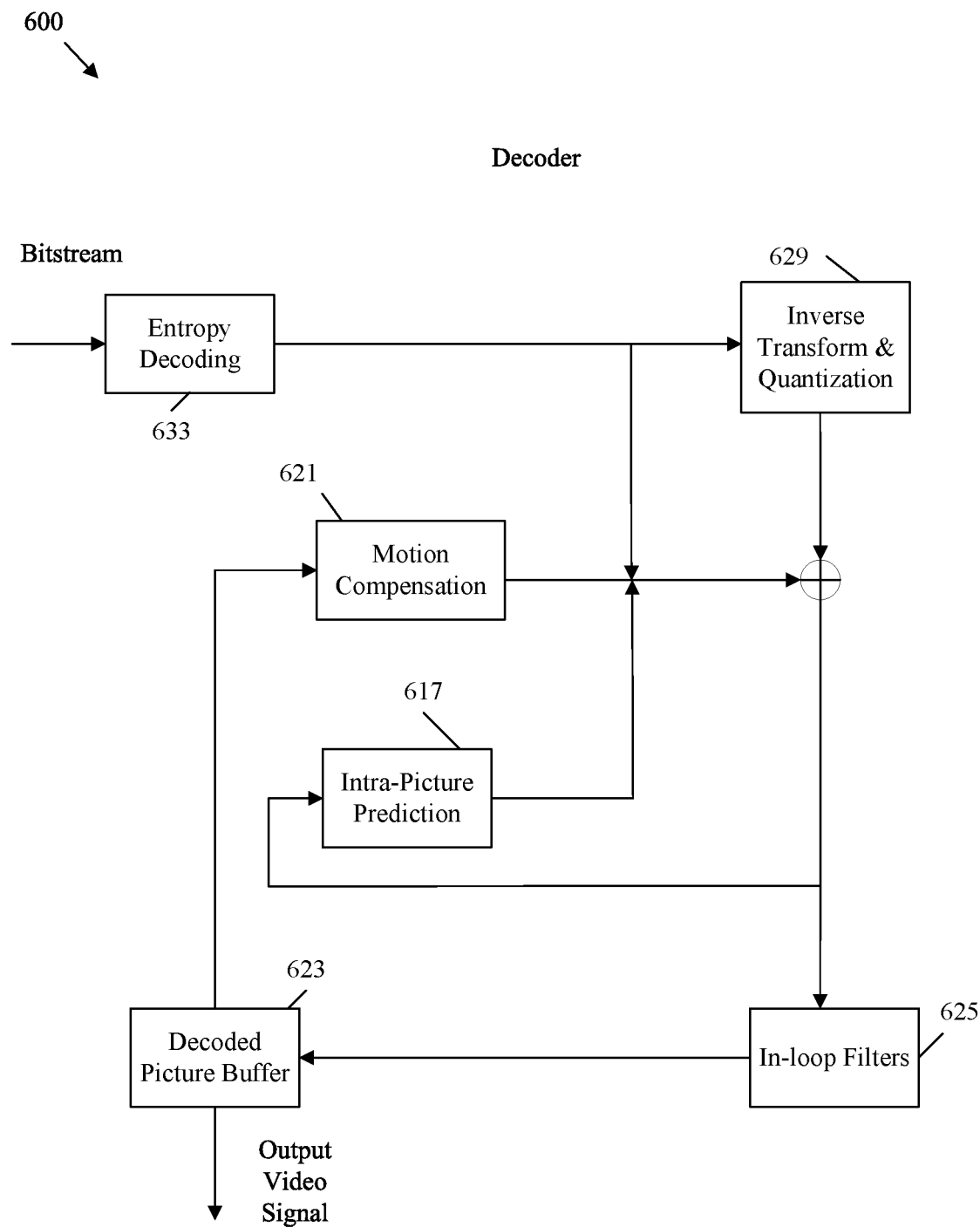
FIG. 6 is a schematic diagram illustrating an example video decoder.

FIG. 6 is a block diagram illustrating an example video decoder 600 that may decode sub-picture bitstreams. Video decoder 600 may be employed to implement the decoding functions of codec system 400 and/or implement steps 311, 313, 315, and/or 317 of operating method 300. Further, decoder 600 may be employed to implement steps 211-213 of method 200 as well as decoder 107. Decoder 600 receives a plurality of sub-picture bitstreams, for example from an encoder 500, generates a reconstructed output video signal including sub-picture video streams, merges the sub-picture video streams into a spherical video stream, and forwards the spherical video stream for display to a user via a rendering device.

The bitstreams are received by an entropy decoding component 633. The entropy decoding component 633 is configured to implement an entropy decoding scheme, such as CAVLC, CABAC, SBAC, PIPE coding, or other entropy coding techniques. For example, the entropy decoding component 633 may employ header information to provide a context to interpret additional data encoded as codewords in the bitstreams. The decoded information includes any desired information to decode the video signal, such as general control data, filter control data, partition information, motion data, prediction data, and quantized transform coefficients from residual blocks. The quantized transform coefficients are forwarded to an inverse transform and quantization component 629 for reconstruction into residual blocks. The inverse transform and quantization component 629 may be similar to inverse transform and quantization component 529.

The reconstructed residual blocks and/or prediction blocks are forwarded to intra-picture prediction component 617 for reconstruction into image blocks based on intra-prediction operations. The intra-picture prediction component 617 may be similar to intra-picture estimation component 415 and an intra-picture prediction component 417. Specifically, the intra-picture prediction component 617 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 623 via an in-loop filters component 625, which may be substantially similar to decoded picture buffer component 423 and in-loop filters component 425, respectively. The in-loop filters component 625 filters the reconstructed image blocks, residual blocks and/or prediction blocks, and such information is stored in the decoded picture buffer component 623. Reconstructed image blocks from decoded picture buffer component 623 are forwarded to a motion compensation component 621 for inter-prediction. The motion compensation component 621 may be substantially similar to motion estimation component 421 and/or motion compensation component 419. Specifically, the motion compensation component 621 employs motion vectors from a reference block to generate a prediction block and applies a residual block to the result to reconstruct an image block. The resulting reconstructed blocks may also be forwarded via the in-loop filters component 625 to the decoded picture buffer component 623. The decoded picture buffer component 623 continues to store additional reconstructed image blocks, which can be reconstructed into frames via the partition information. Such frames may also be placed in a sequence. The sequence is output toward a display as a reconstructed output video signal.

Figure 7:
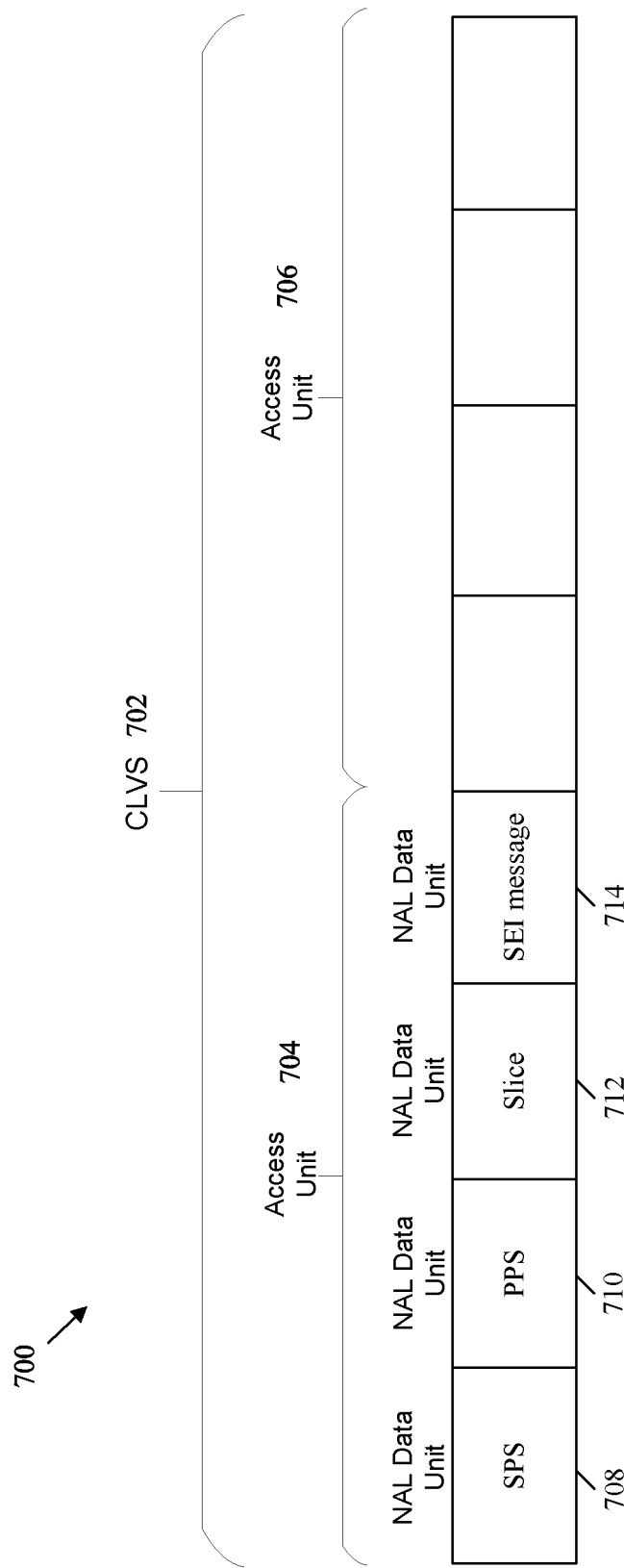
FIG. 7 is a schematic diagram illustrating an example of the structure of a bitstream.

FIG. 7 illustrates an example of the structure of a bitstream 700 configured to carry a flag (e.g., general_non_packed_constraint_flag) to indicate to the decoder whether or not the bitstream 700 includes any fisheye omnidirectional video pictures. As used herein, the flag may be referred to as a signaled property.

As shown, the bitstream 700 includes a CLVS 702. While only one CLVS 702 is depicted in FIG. 7, it should be appreciated that one or more CLVSs may be included in the bitstream 700 in practical applications. The CLVS 702 is segregated into access units, namely a first access unit 704 and a second access unit 706. While two access units are shown in FIG. 7, it should be appreciated that one or more access units may be included in the bitstream 700 in practical applications. The first access unit 704 includes a plurality of network access layer (NAL) data units, namely a first NAL data unit 708, a second NAL data unit 710, a third NAL data unit 712, and a fourth NAL data unit 714. While not shown, the second access unit 706 may include similar NAL data units. Also, while four NAL data units are shown in FIG. 7, it should be appreciated that one or more access units may be included in the bitstream 700 in practical applications.

In an embodiment, the first NAL data unit 708 contains the SPS. As noted above, in an embodiment the flag (e.g., general_non_packed_constraint_flag) or the signaled property, which has a value of 1 or zero, is included in the SPS. In an embodiment, the SPS is disposed in the first NAL data unit 708. The SPS may also be disposed in one or more of the other data units (e.g., the second NAL data unit 710, the third NAL data unit 712, and the fourth NAL data unit 714, etc.) in an embodiment.

In FIG. 7, the second NAL data unit 710 contains the picture parameter set (PPS) and the third NAL data unit 712 contains the slice information. In an embodiment, the PPS and the slice may be disposed in other data units. The fourth NAL data unit 714 may or may not contain an SEI message, depending on the value of the flag in the SPS. For example, when the flag or specified property is set to 1 by the encoder, there are no frame packing arrangement SEI messages, segmented rectangular frame packing arrangement SEI messages, equirectangular projection SEI messages, cubemap projection SEI messages, or omnidirectional fisheye SEI messages present in the CLVS 702 (e.g., a sequence of pictures and the associated non-video coding layer (VCL) NAL units of the base layer of a coded video sequence (CVS)). Alternatively, when the flag or specified property is set to 0 by the encoder, there may or may not be one or more frame packing arrangement SEI messages, segmented rectangular frame packing arrangement SEI messages, equirectangular projection SEI messages, cubemap projection SEI messages, or omnidirectional fisheye SEI messages present in the CLVS 702.

Figure 8:
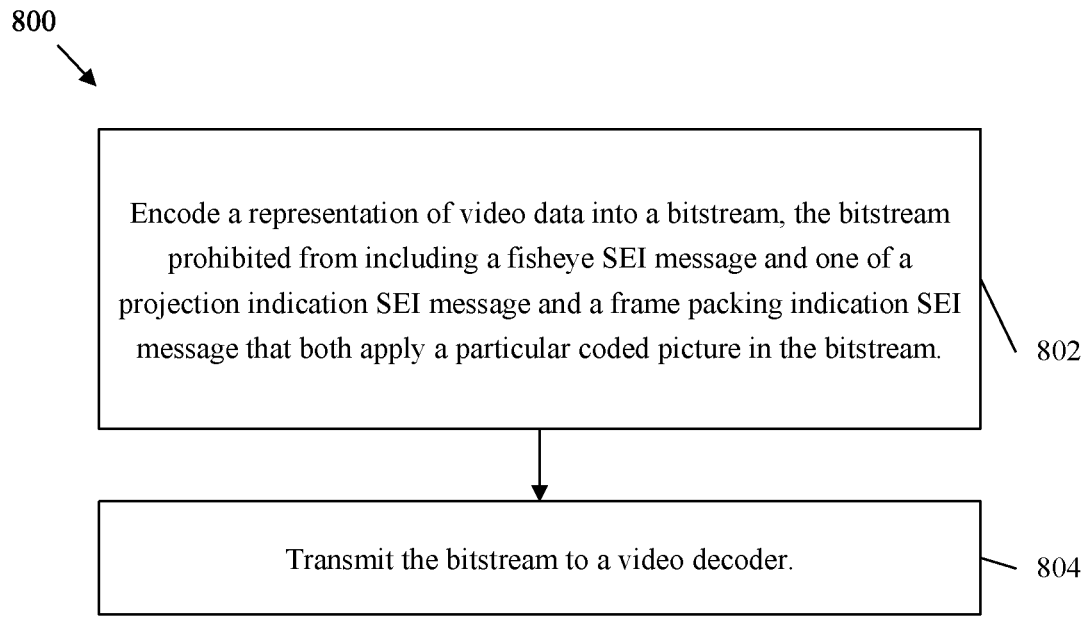
FIG. 8 is an embodiment of a method of coding implemented by a video encoder.

FIG. 8 is an embodiment of a method 800 of coding implemented by a video encoder (e.g., encoder 103). The method 800 may be performed when video data is to be encoded into a bitstream and transmitted to a video decoder (e.g., decoder 107). The method 800 may be performed to ensure that the bitstream can be properly or suitably rendered by the video decoder.

In block 802, a representation of video data is encoded into a bitstream. The bitstream is prohibited from including a fisheye SEI message and one of a projection indication SEI message and a frame packing indication SEI message that both apply to any particular coded picture in the bitstream.

In an embodiment, the representation of video data in the bitstream contains fisheye omnidirectional video pictures. In an embodiment, the projection indication SEI message comprises an equirectangular projection SEI message. In an embodiment, the projection indication SEI message comprises a cubemap projection SEI message. In an embodiment, the frame packing indication SEI message comprises a frame packing arrangement SEI message. In an embodiment, the frame packing indication SEI message comprises a segmented rectangular frame packing arrangement SEI message.

In block 804, the bitstream is transmitted to a video decoder (e.g., decoder 107).

Figure 9:
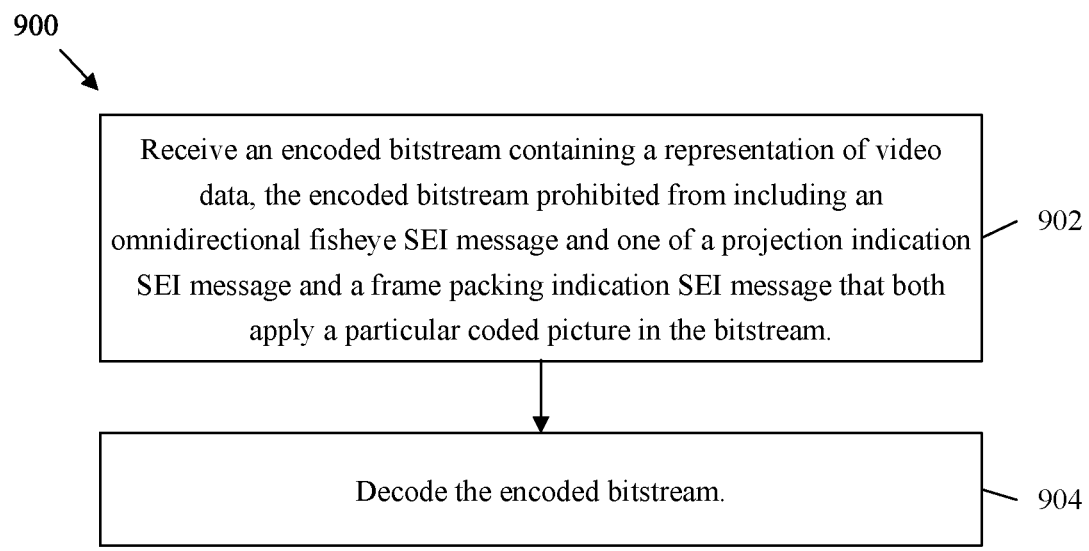
FIG. 9 is an embodiment of a method of coding implemented by a video decoder.

FIG. 9 is an embodiment of a method 900 of coding implemented by a video decoder (e.g., decoder 107). The method 900 may be performed when an encoded bitstream is received. In an embodiment, the encoded bitstream is received from a video encoder (e.g., encoder 103). The method 900 may be performed to ensure that the bitstream can be properly or suitably rendered by the video decoder.

In block 902, an encoded bitstream containing a representation of video data is received. The encoded bitstream is prohibited from including an omnidirectional fisheye SEI message and one of a projection indication SEI message and a frame packing indication SEI message that both apply to any particular coded picture in the bitstream.

In an embodiment, the representation of video data in the bitstream contains fisheye omnidirectional video pictures. In an embodiment, the projection indication SEI message comprises an equirectangular projection SEI message. In an embodiment, the projection indication SEI message comprises a cubemap projection SEI message. In an embodiment, the frame packing indication SEI message comprises a frame packing arrangement SEI message. In an embodiment, the frame packing indication SEI message comprises a segmented rectangular frame packing arrangement SEI message.

In block 904, the encoded bitstream is decoded.

Figure 10:
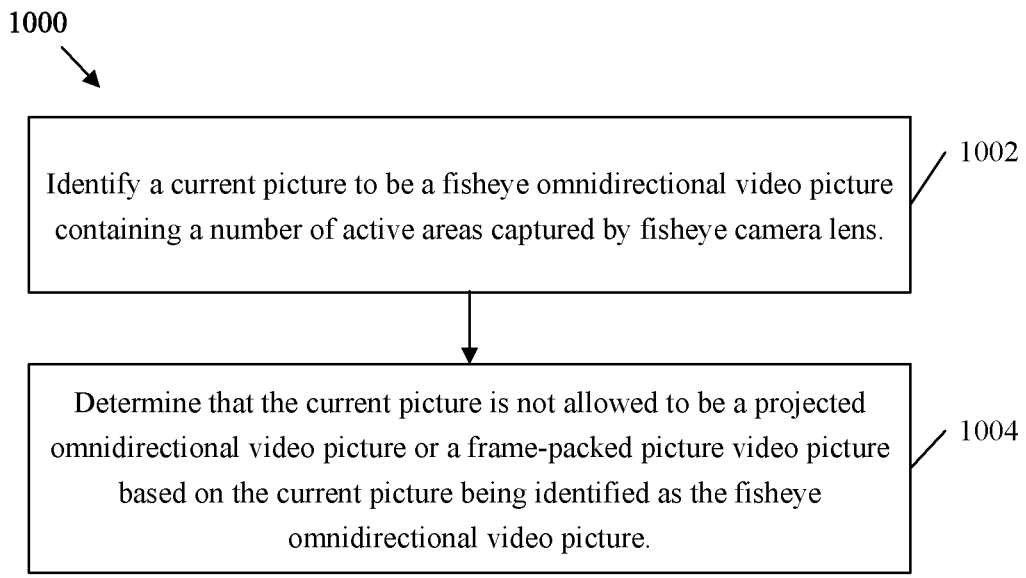
FIG. 10 is an embodiment of a method of coding video information.

FIG. 10 is an embodiment of a method 1000 of coding video information. The method 1000 may be performed when video data is to be encoded into a bitstream and transmitted to a video decoder (e.g., decoder 107). The method 1000 may be performed to ensure that the bitstream can be properly or suitably rendered by the video decoder.

In block 1002, a current picture is identified to be a fisheye omnidirectional video picture containing a number of active areas captured by fisheye camera lens. In an embodiment, the current picture is identified as the fisheye omnidirectional video picture by an omnidirectional fisheye SEI message. In block 1004, a determination is made that the current picture is not allowed to be a projected omnidirectional video picture based on the current picture being identified as the fisheye omnidirectional video picture.

Figure 11:
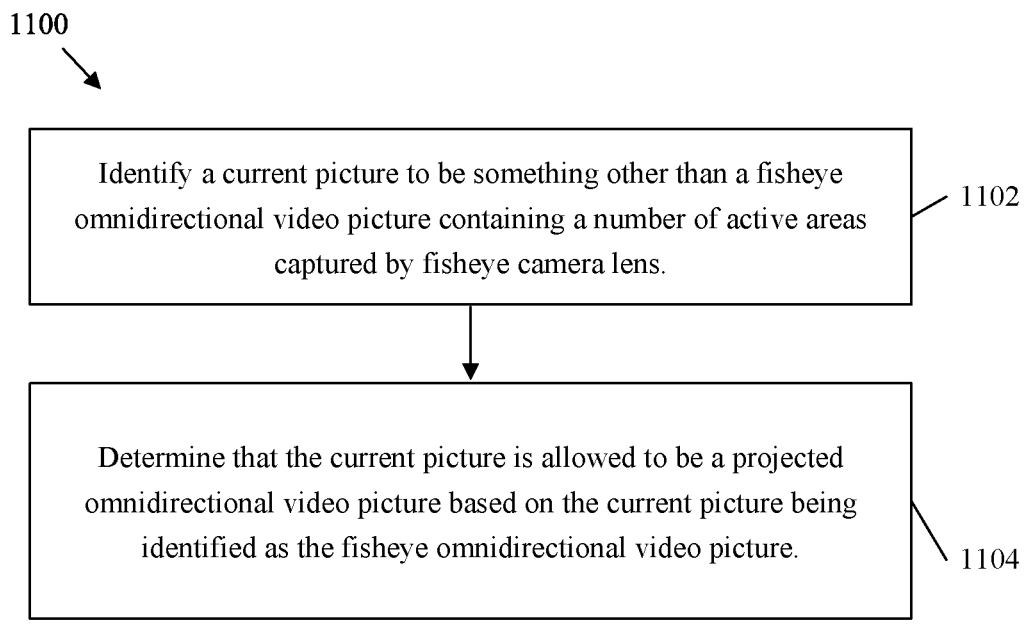
FIG. 11 is an embodiment of a method of coding video information.

FIG. 11 is an embodiment of a method 1100 of coding video information. The method 1100 may be performed when video data is to be encoded into a bitstream and transmitted to a video decoder (e.g., decoder 107). The method 1100 may be performed to ensure that the bitstream can be properly or suitably rendered by the video decoder.

In block 1102, a current picture is identified as something other than a fisheye omnidirectional video picture containing a number of active areas captured by fisheye camera lens. In an embodiment, the current picture is identified as something other than the fisheye omnidirectional video picture by an SEI message. In an embodiment, the current picture is identified as something other than the fisheye omnidirectional video picture by an equirectangular projection SEI message. In an embodiment, the current picture is identified as something other than the fisheye omnidirectional video picture by a cubemap projection SEI message. In block 1104, a determination is made that the current picture is allowed to be a projected omnidirectional video picture based on the current picture being identified as something other than the fisheye omnidirectional video picture.

Figure 12:
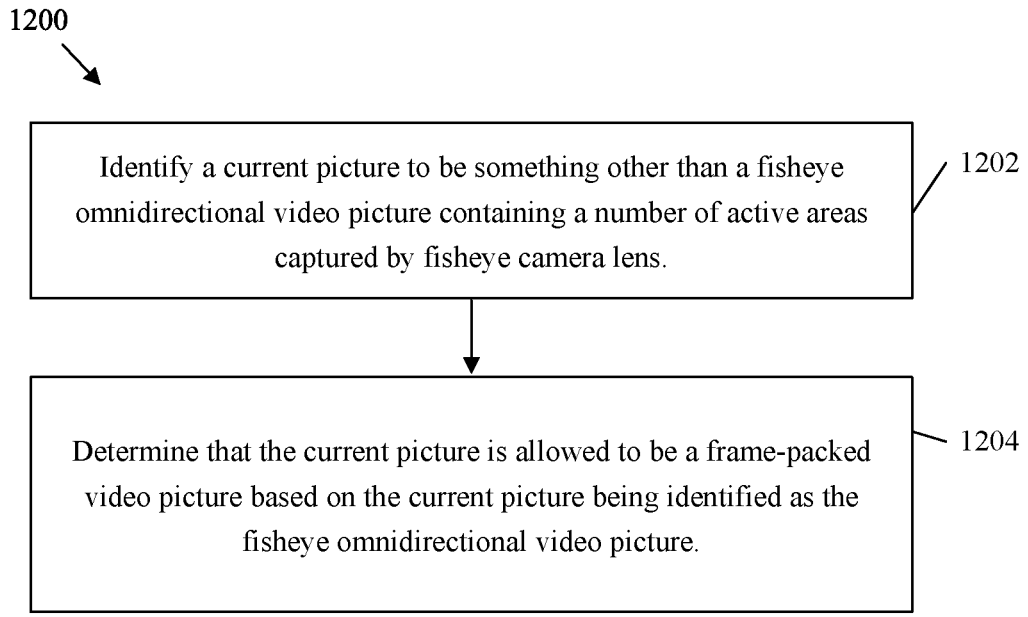
FIG. 12 is an embodiment of a method of coding video information.

FIG. 12 is an embodiment of a method 1200 of coding video information. The method 1200 may be performed when video data is to be encoded into a bitstream and transmitted to a video decoder (e.g., decoder 107). The method 1200 may be performed to ensure that the bitstream can be properly or suitably rendered by the video decoder.

In block 1202, a current picture is identified as something other than a fisheye omnidirectional video picture containing a number of active areas captured by fisheye camera lens. In an embodiment, the current picture is identified as something other than the fisheye omnidirectional video picture by an SEI message. In an embodiment, the current picture is identified as something other than the fisheye omnidirectional video picture by an equirectangular projection SEI message. In an embodiment, the current picture is identified as something other than the fisheye omnidirectional video picture by a cubemap projection SEI message. In block 1204, a determination is made that the current picture is allowed to be a frame-packed omnidirectional video picture based on the current picture being identified as something other than the fisheye omnidirectional video picture.

Figure 13:
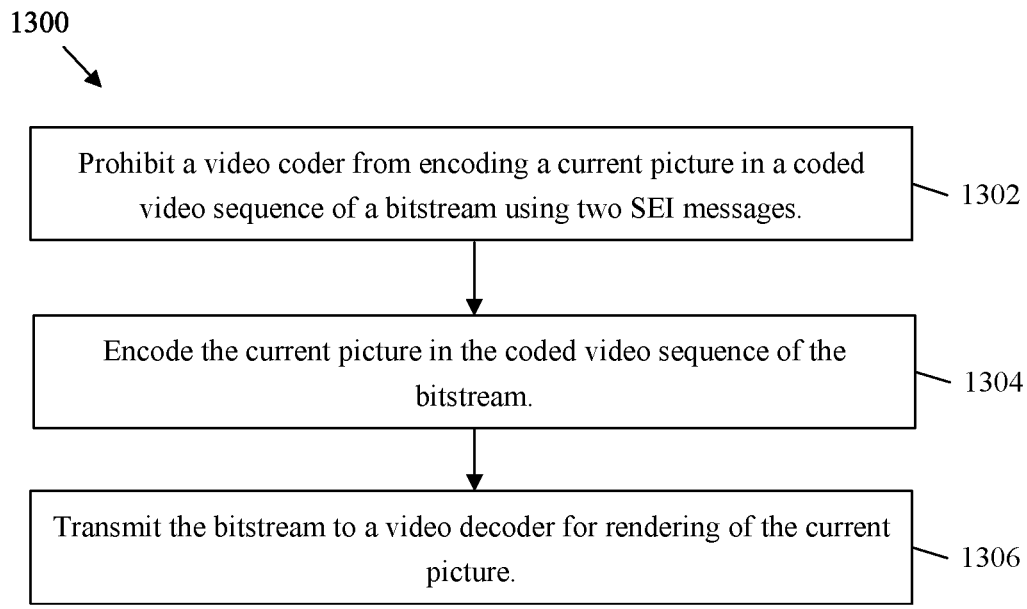
FIG. 13 is an embodiment of a method of coding video information.

FIG. 13 is a method 1300 of coding video information. The method 1300 may be performed when video data is to be encoded into a bitstream and transmitted to a video decoder (e.g., decoder 107). The method 1300 may be performed to ensure that the bitstream can be properly or suitably rendered by the video decoder.

In block 1302, a video encoder is prohibited from encoding a current picture in a coded video sequence of a bitstream with two SEI messages. In an embodiment, one of the two SEI messages is an omnidirectional fisheye SEI message. In an embodiment, the two SEI messages are an omnidirectional fisheye SEI message and a frame packing indication SEI message. In an embodiment, the two SEI messages are an omnidirectional fisheye SEI message and a projection indication SEI message.

In block 1304, the current picture is encoded in a coded video sequence of a bitstream. In block 1306, the bitstream is transmitted to a video decoder for rendering of the current picture.

The ideas of the present disclosure are described above in the context of HEVC. However, the ideas can be applied to any other video codecs, including future video codecs, standard or non-standard ones. Furthermore, the ideas can be individually applied or applied in combination.

Figure 14:
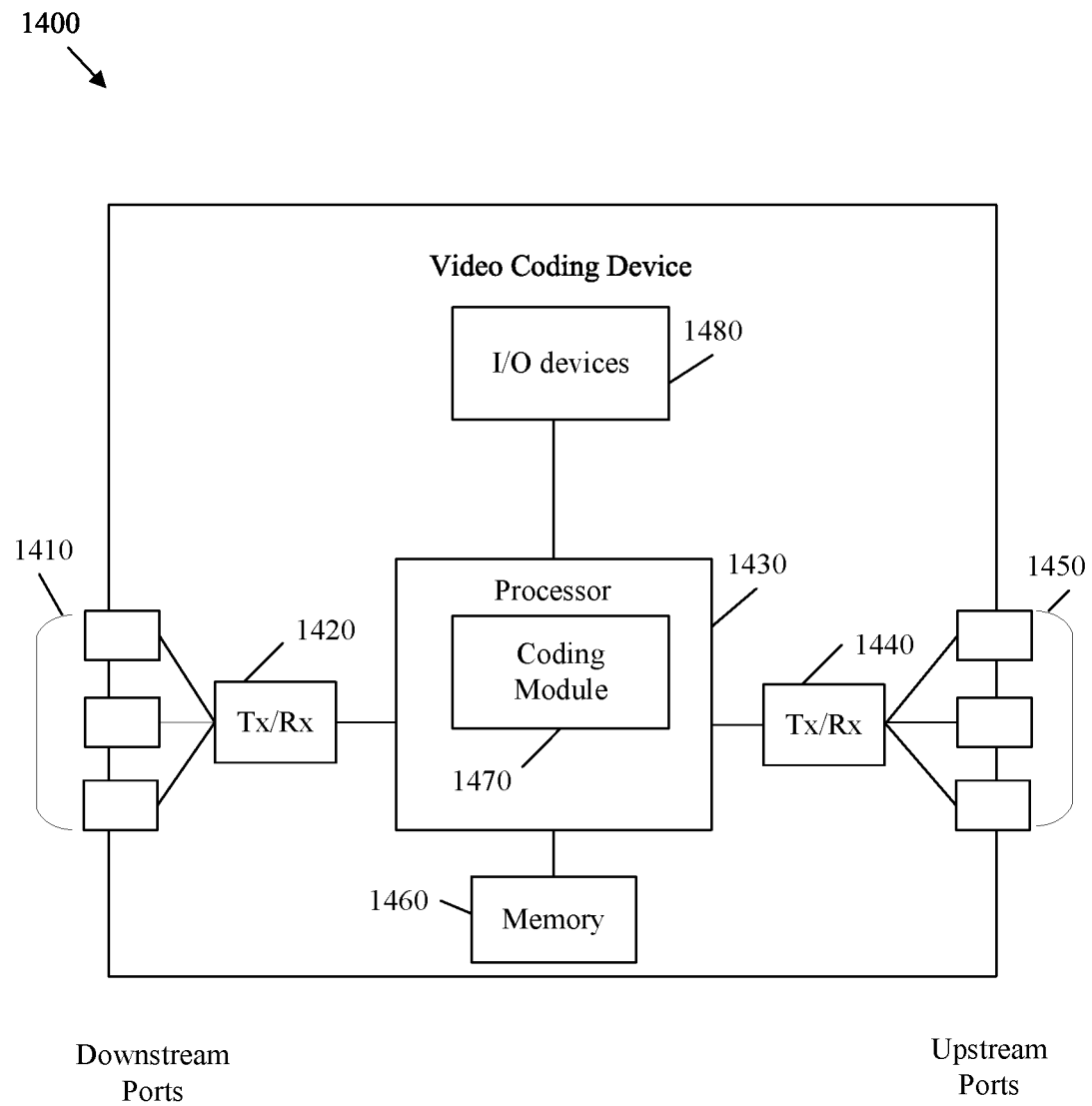
FIG. 14 is a schematic diagram of an example video coding device.

FIG. 14 is a schematic diagram of a coding device 1400 according to an embodiment of the disclosure. The coding device 1400 is suitable for implementing the methods and processes disclosed herein. The coding device 1400 comprises ingress ports 1410 and receiver units (Rx) 1420 for receiving data; a processor, logic unit, or central processing unit (CPU) 1430 to process the data; transmitter units (Tx) 1440 and egress ports 1450 for transmitting the data; and a memory 1460 for storing the data. The coding device 1400 may also comprise optical-to-electrical (OE) components and electrical-to-optical (EO) components coupled to the ingress ports 1410, the receiver units 1420, the transmitter units 1440, and the egress ports 1450 for egress or ingress of optical or electrical signals.

The processor 1430 is implemented by hardware and software. The processor 1430 may be implemented as one or more CPU chips, cores (e.g., as a multi-core processor), field-programmable gate arrays (FPGAs), application specific integrated circuits (ASICs), and digital signal processors (DSPs). The processor 1430 is in communication with the ingress ports 1410, receiver units 1420, transmitter units 1440, egress ports 1450, and memory 1460. The processor 1430 comprises a coding module 1470. The coding module 1470 implements the disclosed embodiments described above. The inclusion of the coding module 1470 therefore provides a substantial improvement to the functionality of the coding device 1400 and effects a transformation of the coding device 1400 to a different state. Alternatively, the coding module 1470 is implemented as instructions stored in the memory 1460 and executed by the processor 1430.

The video coding device 1400 may also include input and/or output (I/O) devices 1480 for communicating data to and from a user. The I/O devices 1480 may include output devices such as a display for displaying video data, speakers for outputting audio data, etc. The I/O devices 1480 may also include input devices, such as a keyboard, mouse, trackball, etc., and/or corresponding interfaces for interacting with such output devices.

The memory 1460 comprises one or more disks, tape drives, and solid-state drives and may be used as an overflow data storage device, to store programs when such programs are selected for execution, and to store instructions and data that are read during program execution. The memory 1460 may be volatile and non-volatile and may be read-only memory (ROM), random-access memory (RAM), ternary content-addressable memory (TCAM), and static random-access memory (SRAM).

Figure 15:
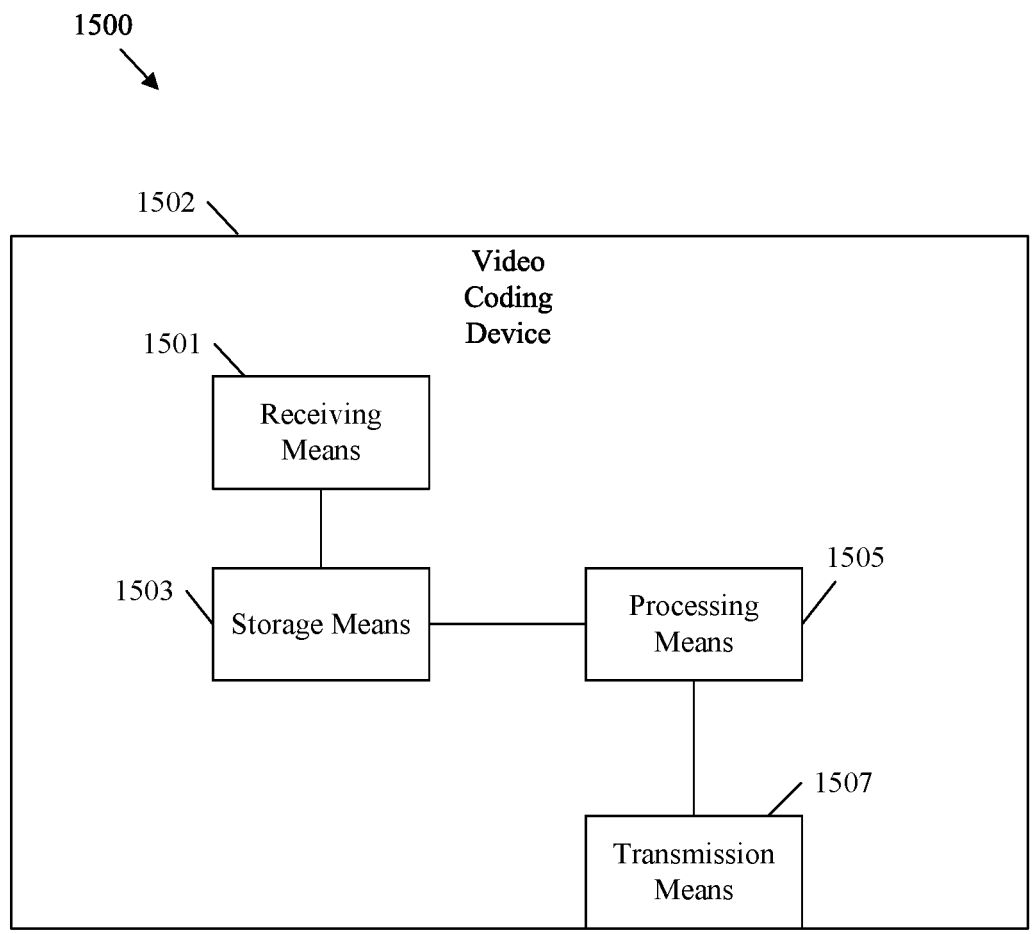
FIG. 15 is a schematic diagram of an embodiment of a means for coding.

FIG. 15 is a schematic diagram of an embodiment of a means for coding 1500. In embodiment, the means for coding 1500 is implemented in a video coding device 1502 (e.g., an encoder 103 or a decoder 107). The video coding device 1502 includes receiving means 1501. The receiving means 1501 is configured to receive a picture to encode or to receive a bitstream to decode. The video coding device 1502 includes transmission means 1507 coupled to the receiving means 1501. The transmission means 1507 is configured to transmit the bitstream to a decoder or to transmit a decoded image to a display means (e.g., one of the I/O devices 1480).

The video coding device 1502 includes a storage means 1503. The storage means 1503 is coupled to at least one of the receiving means 1501 or the transmission means 1507. The storage means 1503 is configured to store instructions. The video coding device 1502 also includes processing means 1505. The processing means 1505 is coupled to the storage means 1503. The processing means 1505 is configured to execute the instructions stored in the storage means 1503 to perform the methods disclosed herein.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method of coding implemented by a video encoder, comprising:
encoding a frame packing arrangement supplemental enhancement information (SEI) message that applies to a picture into a bitstream, the frame packing arrangement SEI message including a frame packing arrangement cancel flag equal to zero to indicate that a second SEI message that applies to the picture and has a second cancel flag equal to zero is not present, wherein the second SEI message is a different type of SEI message than the frame packing SEI message, and wherein the frame packing arrangement cancel flag equal to zero also indicates that a video decoder shall ignore SEI messages of the different type; and
transmitting the bitstream toward the video decoder.

2. The method of claim 1, wherein the second SEI message corresponds to omnidirectional video.

3. The method of claim 1, wherein the second cancel flag corresponds to omnidirectional video.

4. The method of claim 1, wherein the second SEI message comprises a fisheye video information SEI message.

5. The method of claim 1, wherein the second cancel flag comprises a fisheye_cancel_flag.

6. A method of coding implemented by a video decoder, comprising:
receiving an encoded bitstream containing a frame packing arrangement supplemental enhancement information (SEI) message that applies to a picture, the frame packing arrangement SEI message including a frame packing arrangement cancel flag equal to zero to indicate that a second SEI message that applies to the picture and has a second cancel flag equal to zero is not present, wherein the second SEI message is a different type of SEI message than the frame packing SEI message, and wherein the frame packing arrangement cancel flag equal to zero also indicates that the video decoder shall ignore SEI messages of the different type; and
decoding the encoded bitstream according to the frame packing arrangement cancel flag.

7. The method of claim 6, wherein the second SEI message corresponds to omnidirectional video.

8. The method of claim 6, wherein the second cancel flag corresponds to omnidirectional video.

9. The method of claim 6, wherein the second SEI message comprises a fisheye video information SEI message.

10. The method of claim 6, wherein the second cancel flag comprises a fisheye_cancel_flag.

11. A video coding apparatus, comprising:
a memory storing instructions;
one or more processors coupled to the memory, the one or more processors configured to execute the instructions to cause the video coding apparatus to:
encode a frame packing arrangement supplemental enhancement information (SEI) message that applies to a picture into a bitstream, the frame packing arrangement SEI message including a frame packing arrangement cancel flag equal to zero to indicate that a second SEI message that applies to the picture and has a second cancel flag equal to zero is not present, wherein the second SEI message is a different type of SEI message than the frame packing SEI message, and wherein the frame packing arrangement cancel flag equal to zero also indicates that a video decoder shall ignore SEI messages of the different type; and
transmit the bitstream toward the video decoder.

12. The video coding apparatus of claim 11, wherein the second SEI message corresponds to omnidirectional video.

13. The video coding apparatus of claim 11, wherein the second cancel flag corresponds to omnidirectional video.

14. The video coding apparatus of claim 11, wherein the second SEI message comprises a fisheye video information SEI message.

15. The video coding apparatus of claim 11, wherein the second cancel flag comprises a fisheye_cancel_flag.

16. A video coding apparatus, comprising:
a memory storing instructions;
one or more processors coupled to the memory, the one or more processors configured to execute the instructions to cause the video coding apparatus to:
receive an encoded bitstream containing a frame packing arrangement supplemental enhancement information (SEI) message that applies to a picture, the frame packing arrangement SEI message including a frame packing arrangement cancel flag equal to zero to indicate that a second SEI message that applies to the picture and has a second cancel flag equal to zero is not present, wherein the second SEI message is a different type of SEI message than the frame packing SEI message, and wherein the frame packing arrangement cancel flag equal to zero also indicates that a video decoder shall ignore SEI messages of the different type; and
decode the encoded bitstream according to the frame packing arrangement cancel flag.

17. The video coding apparatus of claim 16, wherein the second SEI message corresponds to omnidirectional video.

18. The video coding apparatus of claim 16, wherein the second cancel flag corresponds to omnidirectional video.

19. The video coding apparatus of claim 16, wherein the second SEI message comprises a fisheye video information SEI message.

20. The video coding apparatus of claim 16, wherein the second cancel flag comprises a fisheye_cancel_flag.

* * * * *